(12) United States Patent
Dietz

(10) Patent No.: US 11,768,557 B2
(45) Date of Patent: Sep. 26, 2023

(54) VEHICULAR COMPONENTS COMPRISING SENSORS

(71) Applicant: Tactual Labs Co., New York, NY (US)

(72) Inventor: Paul Henry Dietz, Redmond, WA (US)

(73) Assignee: Tactual Labs Co., New York, NY (US)

( * ) Notice: Subject to any disclaimer, the term of this patent is extended or adjusted under 35 U.S.C. 154(b) by 197 days.

(21) Appl. No.: 17/166,326

(22) Filed: Feb. 3, 2021

(65) Prior Publication Data

US 2021/0397325 A1 Dec. 23, 2021

Related U.S. Application Data

(63) Continuation-in-part of application No. 17/113,006, filed on Dec. 5, 2020, now abandoned, and a (Continued)

(51) Int. Cl.
*G06F 3/041* (2006.01)
*A63F 13/214* (2014.01)

(Continued)

(52) U.S. Cl.
CPC ........ *G06F 3/04166* (2019.05); *A63F 13/214* (2014.09); *A63F 13/2145* (2014.09); *G06F 1/163* (2013.01); *G06F 3/017* (2013.01); *G06F 3/0446* (2019.05); *G06F 3/04883* (2013.01); *A63F 13/212* (2014.09);

(Continued)

(58) Field of Classification Search
CPC . G01B 7/28; G01B 11/16; G01B 7/20; G01B 7/24; G01B 7/287; G01B 7/22; G01D 5/268; G01D 5/241; G01D 5/16; G06F 3/014; A61B 5/1071; A61B 5/6826; A61B 2562/043; A61B 2562/125
See application file for complete search history.

(56) References Cited

U.S. PATENT DOCUMENTS 6,392,542 B1 * 5/2002 Stanley ............... B60N 2/28
701/45
2009/0151478 A1 * 6/2009 Shimomoto ........... G01L 1/146
73/862.626

(Continued)

*Primary Examiner* — Christopher P McAndrew
*Assistant Examiner* — Zannatul Ferdous
(74) *Attorney, Agent, or Firm* — Adam B. Landa

(57) ABSTRACT

A vehicle seat comprises a seat component having a contour; wherein the contour changes when at least a portion of a user's body is in contact with the seat component and at least one multibend sensor operatively connected to the seat component and adapted to at least partially conform to the contour of the seat component; the at least one multibend sensor comprising a signal generation source adapted to transmit signals and a signal receiver adapted to receive at least some of the transmitted signals. The seat further comprises a signal processor operatively connected to the signal receiver, the signal processor adapted to make at least one measurement associated with the received signals; and, a sensing module operatively connected to the signal processor and configured to use the at least one measurement to determine information regarding the contour of the seat component.

20 Claims, 19 Drawing Sheets

Related U.S. Application Data continuation-in-part of application No. 17/077,801, filed on Oct. 22, 2020, now abandoned, and a continuation-in-part of application No. 17/026,252, filed on Sep. 20, 2020, and a continuation-in-part of application No. 16/995,727, filed on Aug. 17, 2020, and a continuation-in-part of application No. 16/799,691, filed on Feb. 24, 2020, now Pat. No. 11,112,905, and a continuation-in-part of application No. 16/270,805, filed on Feb. 8, 2019, now Pat. No. 11,221,202, said application No. 16/799,691 is a continuation of application No. 16/110,637, filed on Aug. 23, 2018, now Pat. No. 10,572,088.

(60) Provisional application No. 63/091,229, filed on Oct. 13, 2020, provisional application No. 62/986,370, filed on Mar. 6, 2020, provisional application No. 62/970,524, filed on Feb. 5, 2020, provisional application No. 62/970,017, filed on Feb. 4, 2020, provisional application No. 62/947,094, filed on Dec. 12, 2019, provisional application No. 62/944,814, filed on Dec. 6, 2019, provisional application No. 62/925,214, filed on Oct. 23, 2019, provisional application No. 62/903,272, filed on Sep. 20, 2019, provisional application No. 62/887,324, filed on Aug. 15, 2019, provisional application No. 62/748,984, filed on Oct. 22, 2018.

(51) Int. Cl.
*G06F 1/16* (2006.01)
*G06F 3/01* (2006.01)
*A63F 13/2145* (2014.01)
*G06F 3/0488* (2022.01)
*G06F 3/044* (2006.01)
*G06F 3/04883* (2022.01)
*A63F 13/212* (2014.01)

(52) U.S. Cl.
CPC ........ *G06F 3/0448* (2019.05); *G06F 3/04164* (2019.05); *G06F 2203/04102* (2013.01); *G06F 2203/04104* (2013.01)

(56) References Cited

U.S. PATENT DOCUMENTS

| | | | |
|---|---|---|---|
| 2009/0293631 A1* | 12/2009 | Radivojevic | G01L 1/16 |
| 2011/0018557 A1* | 1/2011 | Badaye | G06F 3/0446 |
| | | | 324/658 |
| 2013/0133435 A1* | 5/2013 | Muramatsu | G01B 7/18 |
| | | | 73/799 |
| 2015/0265200 A1* | 9/2015 | Mahdi | A61B 7/02 |
| | | | 600/528 |
| 2016/0254328 A1* | 9/2016 | Song | H01L 51/525 |
| | | | 324/699 |
| 2017/0265810 A1* | 9/2017 | Van De Vyver | A61B 5/1126 |
| 2018/0113003 A1* | 4/2018 | Huang | G01B 7/20 |
| 2018/0162319 A1* | 6/2018 | Moenkemoeller | G01V 3/088 |
| 2018/0229674 A1* | 8/2018 | Heinrich | B60K 28/063 |

\* cited by examiner

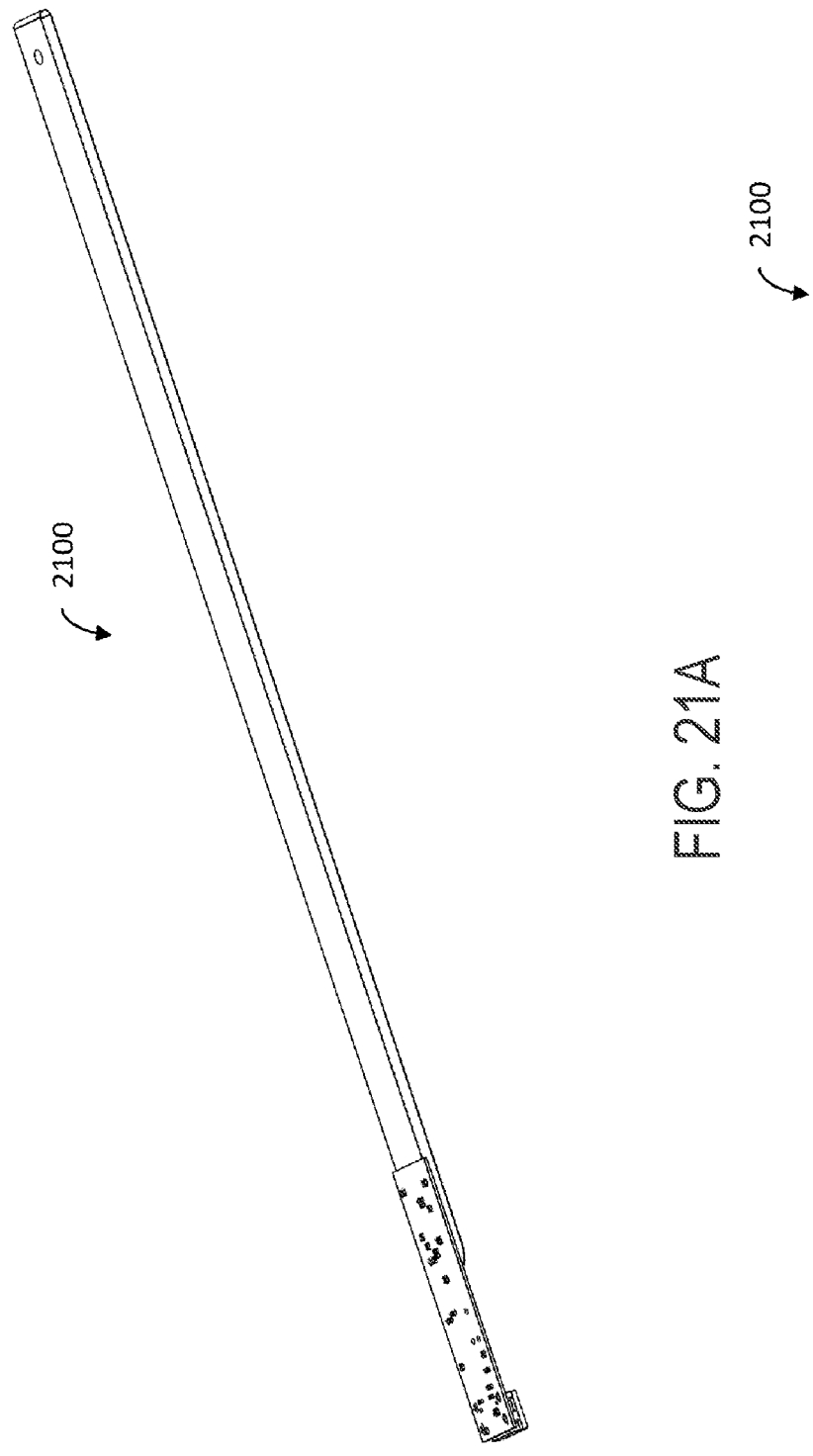
FIG. 21A
FIG. 21B

VEHICULAR COMPONENTS COMPRISING SENSORS

This application is a continuation in part of U.S. patent application Ser. No. 17/113,006 filed Dec. 5, 2020; which claims the benefit of U.S. Provisional Application No. 62/944,814 filed Dec. 6, 2019; and U.S. Provisional Application No. 62/947,094 filed Dec. 12, 2019. This application is also a continuation in part of U.S. patent application Ser. No. 17/077,801 filed Oct. 22, 2020; which claims the benefit of U.S. Provisional Application No. 62/925,214 filed Oct. 23, 2019. This application claims the benefit of U.S. Provisional Application No. 63/091,229 filed Oct. 13, 2020. This application is also a continuation in part of U.S. patent application Ser. No. 17/026,252 filed Sep. 20, 2020; which claims the benefit of U.S. Provisional Application No. 62/903,272 filed Sep. 20, 2019. This application is a continuation in part of U.S. patent application Ser. No. 16/995,727 filed Aug. 17, 2020; which claims the benefit of U.S. Provisional Application No. 62/887,324 filed Aug. 15, 2019. This application also claims the benefit of U.S. Provisional Application No. 62/986,370 filed Mar. 6, 2020. This application is a continuation in part of U.S. patent application Ser. No. 16/799,691 filed Feb. 24, 2020; which is a continuation of U.S. patent application Ser. No. 16/110,637 filed Aug. 23, 2018, now issued U.S. Pat. No. 10,572,088. This application claims the benefit of U.S. Provisional Application No. 62/970,524 filed Feb. 5, 2020. This application also claims the benefit of U.S. Provisional Application No. 62/970,017 filed Feb. 4, 2020. This application is a continuation in part of U.S. patent application Ser. No. 16/270,805 filed Feb. 8, 2019; which claims the benefit of U.S. Provisional Application No. 62/748,984 filed Oct. 22, 2018. The contents of all of the aforementioned applications are incorporated herein by reference. This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The disclosed apparatus and methods relate to the field of sensing, and in particular to providing accurate determination of contours using a multibend sensor in a vehicle.

BACKGROUND

Bend sensors have long been used in many consumer product applications for detecting pose, movement, or motion. For instance, sensing gloves have been employed to detect hand gestures. An example is the Dataglove, set forth in U.S. Pat. No. 5,097,252, which employed optical bend sensors along the fingers to detect finger position. Nintendo's Power Glove used a similar design, but with resistive bend sensors. In both cases, the bend sensors were not very sensitive, providing only a single measure of the overall bend for each bend sensor.

Bend sensors are used in applications beyond finger and hand sensing. They are often employed to understand human motion more generally. Recent decades have seen tremendous progress in the development of high accuracy sensors and their low cost, mass production. Much of this has been driven by smartphones which include an impressive array of sensors. Despite these advancements, there are still many things about the physical world that have proven surprisingly difficult to sense with an inexpensive, precision device. We consider the challenging problem of sensing the shape of a dynamically deforming object.

The desire to understand shape arises in many applications. In robotics, rotary joints are frequently cascaded to allow dexterous, multi-axis motion that must be monitored to be actively controlled. Launching a large rocket has been compared to "pushing on a string", and it requires a detailed understanding of dynamic flexure. Bridges, storage tanks, planes and many other structures are subject to repeated load cycling and understanding deformation in these systems can help prevent catastrophe. More germane to the Human-Computer Interaction (HCI) community, our bodies are quite flexible. In medicine and sports performance, it is often important to understand the range and type of motion. Motion capture is critically important to both the gaming and movie industries. In virtual and augmented reality, a real-time understanding of detailed hand pose allows compelling interactions. For performance, musicians and other artists can manipulate shape intuitively to provide expressive control of key systems.

To better understand the positions of systems with multiple joints, some systems have used a bend sensor per joint, or at each point of articulation. There are challenges with this approach that limit its practicality. For example, the bend sensors have to be custom fitted for the spacing between joints. The need for fitting for the spacing can be problematic for tracking human motion because of size variation in people.

Additionally, there is the problem of cascaded error from the joint measurements. For example, the angle of each successive segment of a finger may be determined as the sum of the joint angles to that segment. Thus, any errors in the angle measurements taken for each of the preceding joints accumulate. Therefore robot arms use extremely high precision angular encoders to find a modestly precise position. Unfortunately, inexpensive bend sensors have poor angular precision making them inadequate for understanding the impacts of cascaded joint error.

Systems have attempted to overcome this shortcoming by using cameras and other sensing techniques to directly measure finger positions. Camera-based techniques are challenged by the difficulty of finding good viewpoints from which to view what is happening. Other position sensor systems can be bulky and/or expensive. Inertial tracking can be used but it has severe drift issues.

There are also Fiber Bragg Grating sensors that permit measuring bends along the length of a fiber bundle and can recover detailed shapes of a particular geometry. These sensors are difficult to make and require significant, bulky instrumentation and complex calibration. Further, they are expensive and impractical for most applications.

Most of the prior work uses sensors that give a single measure of bend. To sense complex curves, one can employ a series of single bend sensors, building a model of connected joints. This works best when the underlying thing to be sensed is well modelled as a series of linkages. However, placement of the sensors requires an a priori understanding of the joint locations. For example, when modelling human joints such as a finger, there is significant variation in location from person to person, precluding a general solution.

Complex curves may require a large number of single bend sensors to provide an adequate understanding of shape. Unfortunately, each additional bend sensor contributes measurement error, which accumulates to progressively degrade the overall accuracy of the system. This severely limits the maximum number of single bend sensors that can reasonably be employed.

Recently, machine learning approaches have been applied to understanding the output of systems with many single bend sensors. While these systems have the potential to combine the readings from large numbers of single bend sensors such that error does not accumulate in such a direct fashion, they require extensive training. It is also unclear if any reduction in accumulated error comes from imposing constraints that make the system less general The most common way of detecting flexure is by measuring the changing properties of a material under strain. Spectra Symbols' Flex sensor is an example. Strain is a problematic proxy for flexure. Stretching, environmental conditions, and other factors can induce strain that cannot be easily distinguished from that due to bending. Continual strain cycles can also cause material fatigue.

The most common strain-based bend sensors are resistive, optical including Fiber Bragg Grating (FBG) sensors, piezoelectric or capacitive. We consider each of these and discuss their operation. Resistive bend sensors are similar to resistive strain gauges but are optimized for much larger bends. A layer of resistive material is placed on a flexible substrate and undergoes strain as the sensor is bent. A bend away from the side with the resistive material causes tensile strain, increasing the resistance.

Resistive sensors suffer from significant drift due to fatigue, aging of materials and environmental conditions, and require constant recalibration to achieve even modest accuracy. Because they provide only a single measure of bend, they cannot distinguish shape for complex curves. For example, in the case of monitoring finger bend, the sensor cannot distinguish flexure at different joints from one another. Although resistive bend sensors have many limitations, they are quite inexpensive and easy to interface to, allowing use in many applications. The best known of these is the Nintendo PowerGlove, an early consumer hand pose interface device used for gaming. have embedded commercial flex sensors into both soft and rigid materials to create different control interactions like switches or sliders. Inkjet printing has been used to form customized shapes to create game controllers and toys in two and three dimensions.

Fiber Optic Shape Sensors (FOSS) are comprised of flexible tubes with reflective interior walls which have a light transmitter and receiver at opposite ends. FOSS recover the bend shape by measuring changes in intensity, phase, polarization or wavelength of the light while the flexible tube is bent.

Fiber Bragg Grating (FBG) sensors employ an optical fiber that has been processed to create a grating that interacts with light of a specific wavelength. As the fiber is bent, the grating is mechanically expanded or compressed, which shifts the wavelength of interest. Generally, a tunable laser is used to scan for the new wavelength of the deformed grating. Different wavelength grating patterns can be placed at different locations along the fiber, allowing the degree of bending to be independently measured at each location.

FOSS can be extremely thin and light weight with little restriction on the length of the sensor. They are relatively precise and immune to electromagnetic inferences. While these sensors can provide impressive performance, it comes at a very high price. A tunable laser interrogator may cost as much as USD$10,000—a cost that severely limits the practical applications. While the fiber can be quite thin, the interrogators tend to be large and power hungry. They require complex fabrication process and calibration as well as sophisticated signal processing. They have a restricted range of measurement for curvatures and fall into non-linearity very quickly. These reasons limit their use cases to very specific applications like medical devices but not for daily human routines.

Piezoelectric bend sensors are based on deformation and strain in piezo materials. Such deformations change the surface charge density of the material and cause charge transfer between the electrodes. The amplitude and frequency of the signal is directly proportional to the applied mechanical stress. Piezoelectric sensors, similar to triboelectric sensors, suffer from drift and only provide signal while in motion. This limits their application to dynamic bending only and not static or low-frequency deformations.

Most resistive strain sensors have high-latency and are unable to measure the absolute angles of bend. The hysteresis properties of conductive materials produce varying conductivity during cyclic loading. Most resistive and FBG (Fiber Bragg Grating) sensors are non-linear in response to large strains.

An alternative to strain sensing is what we call geometric sensing. These sensors much more directly measure curvature by sensing geometric changes that are a result of bending. Examples include, measuring relative displacements of different sensor layers.

Therefore, there is a need for an improved method and apparatus for accurately determining bending through the use of sensors and to improve the accuracy of such bending.

BRIEF DESCRIPTION OF THE DRAWINGS

The foregoing and other objects, features, and advantages of the disclosure will be apparent from the following more particular description of embodiments as illustrated in the accompanying drawings in which reference characters refer to the same parts throughout the various views. The drawings are not necessarily to scale, emphasis instead being placed upon illustrating principles of the disclosed embodiments.

FIG. 21A is an isometric view of a multibend sensor.

FIG. 21B is a side view of the multibend sensor of FIG. 21A.

DETAILED DESCRIPTION

Figure 1:
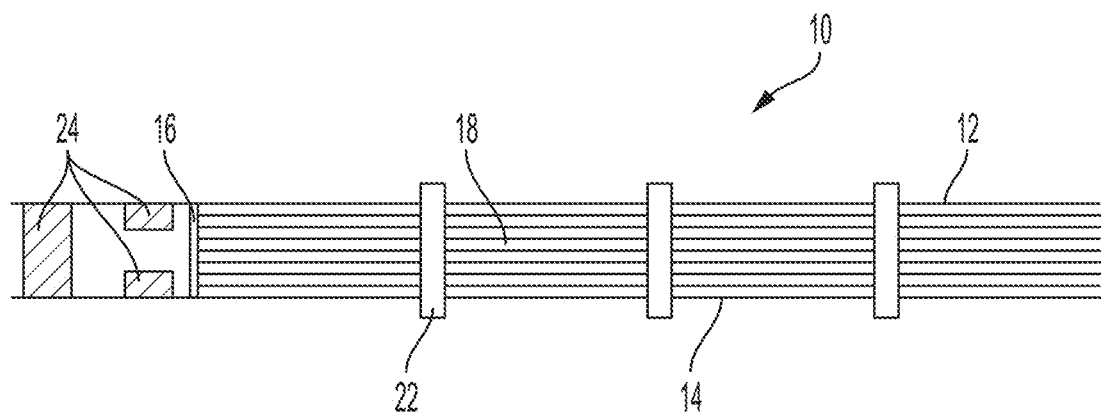
FIG. 1 shows a side view of a multibend sensor.

The present application describes various embodiments of multibend sensors, methods for making such sensors, and vehicular components that incorporate multibend sensors. Embodiments and techniques described herein allow for the accurate measurement of complex curves. In an embodiment, a multibend sensor detects multiple bends. In an embodiment, a multibend sensor measures over many points. In an embodiment, the multibend sensor detects multiple bends along the length of the sensor and uses measurements taken to create an accurate determination of its current shape.

Unlike previous systems that measured angles independently at multiple points, by measuring the relative shift, it can be shown that measurement errors at one point do not impact the understanding of the angles at other points. By measuring at many points the relative shift between flexible strips as they are bent into a complex fashion, the shape of the multibend sensor can be determined. Unlike the previous systems that measured angles independently at multiple points thereby accumulating error, by measuring shift, measurement errors at one point do not impact the understanding of absolute angle at other points. This makes embodiments described herein less sensitive to measurement error.

In an embodiment, the multibend sensor comprises two flat, flexible strips. In an embodiment, the multibend sensor comprises three triangular, flexible strips. As used herein and throughout the application "strip" means a piece of material that is generally longer in one dimension or axis than in it's other dimensions or axes. A strip may be rectangular shaped, cylindrical shaped, triangular shaped or generally have an amorphous shape, provided one dimension is longer than the other(s). In an embodiment, one of the strips is a reference strip and the other strip is a sliding strip. In an embodiment, one of the strips is both a reference strip and a sliding strip at the same time or changes between the two at different times. In an embodiment, one of the strips comprises at least two reference strips. In an embodiment, one of the strips comprises at least two sliding strips. While the strips are referred to as reference strips and sliding strips it should be understood that the roles of reference strip and sliding strip are interchangeable.

In an embodiment, a reference strip and a sliding strip are separated by a spacer and mechanically joined on one end. The lengths of the reference strip and the sliding strip are substantially the same. A plurality of retainers can ensure that the strips remain pressed against the spacer so that the distance between the strips remains substantially constant when being used. At measurement points along the reference strip, that can be determined by a variety of different methods, the corresponding location on the sliding strip can be measured. When the multibend sensor is straight, the strips line up.

In an embodiment, a multibend sensor is a capacitive sensor. As will be noted by those skilled in the art, capacitive bend sensors work either by material strain or displacement between sensor layers. Either way the geometric changes vary the effective overlapping surface areas for capacitive coupling and/or the spacing between conductors as a function of the bending angle. Capacitive sensors can be more linear than other techniques. They are inexpensive to produce and more stable than resistive sensors.

In an embodiment, a multibend sensor is a low cost, precise, dynamic sensor for sensing bends and reconstructing the detailed shape of curves. In an embodiment, a multibend sensor comprises a stack of flexible strips that can be formed into complex curves in a plane. In an embodiment, a multibend sensor measures curvature by noting the relative shift between inner and outer layers of the sensor at many points.

Figure 2:
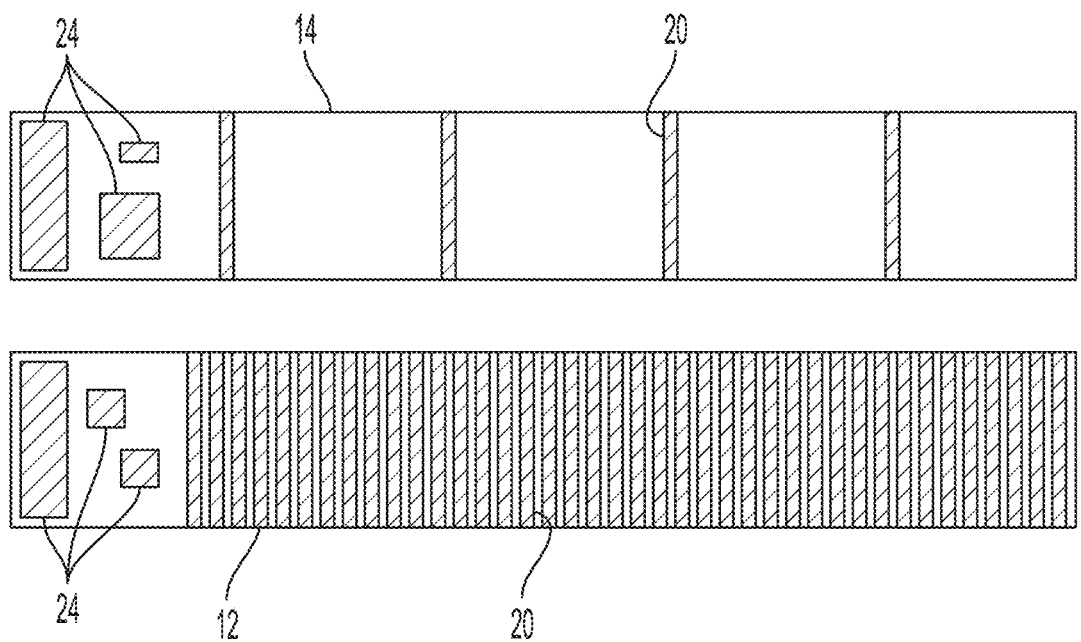
FIG. 2 shows sensor strips of a multibend sensor.

Referring now to FIGS. 1 and 2, shown is an embodiment of a multibend sensor 10. FIG. 1 shows a schematic side view of the multibend sensor 10. In the embodiment shown, the multibend sensor 10 has a sliding strip 12 and a reference strip 14. FIG. 2 shows a top view of the reference strip 14 and a bottom view of the sliding strip 12. The sliding strip 12 is secured to the reference strip 14 at a distal end 16 of the reference strip 14. In the embodiment shown there is a spacer 18 located between the sliding strip 12 and the reference strip 14. In an embodiment, a multibend sensor 10 has multiple spacers 18. Additionally shown are retainers 22 that retain the sliding strip 12 and the reference strip 14 against the spacer 18.

Operably connected to the sliding strip 12 and the reference strip 14 is circuitry 24 that is adapted to receive and process measurements that occur. In the embodiment shown, the circuitry 24 may comprise components, or be operably connected to components, such as processors, signal generators, receivers, connectors, etc.

The sliding strip 12 and the reference strip 14 may be formed from flexible printed circuit board strips. While the sliding strip 12 and the reference strip 14 are shown having specific electrode patterns, it should be understood that the roles of each of the respective strips may be changed and that the sliding strip 12 may function as the reference strip 14 and vice versa depending on the particular implementation. Electrodes 20 may be placed on the surfaces of the sliding strip 12 and the reference strip 14. The electrodes 20 are adapted to transmit and receive signals. The electrodes 20 may be arranged in any pattern that is capable of determining a change during the bending of the sliding strips 12 and the reference strip 14. Additionally, the number, size and shape of the electrodes 20 implemented on sliding strip 12 and the reference strip 14 may be changed based on a particular implementation. In an embodiment, the circuitry 24 is operably connected to the electrodes 20. The circuitry 24 processes the signals received from the electrodes 20 to measure the relative shift between the electrodes in the different strips as the strips are formed into curves.

Still referring to FIGS. 1 and 2, the sliding strip 12 and the reference strip 14 are flexible and able to move and bend. Additionally the spacer 18, which is placed between the sliding strip 12 and the reference strip 14, is flexible and able to move and bend. In an embodiment, the spacer 18 may have different levels of flexibility with respect to the sliding strip 12 and the reference strip 14. In an embodiment, the sliding strip 12, the reference strip 14 and the spacer 18 may each have different levels of flexibility. In an embodiment, there is no spacer 18 and the sliding strip 12 and the reference strip 14 move with respect to each other.

The spacer 18 used in the embodiments preferably keeps the strips spaced at a constant distance regardless of the amount of bending, yet still permits relative sliding. Spacer 18 preferably has a thickness that is able to permit there to be differences between the lengths of the sliding strip 12 and the reference strip 14 when there is bending. In an embodiment, there may be no spacer and the sliding strip 12 and the reference strip 14 may be abutting each other, however there should still be sufficient distance between the outward facing sides to permits sensing of the relative shift between the sliding strip 12 and the reference strip 14 during a bend. In an embodiment, the spacer 18 may have the same flexibility as the sliding strip 12 and the reference strip 14. A thick spacer 18 will provide a good amount of shift, but the spacer 18 itself may change thickness with a tight bend. A thin spacer 18 will have this issue less but may not provide adequate shifting. In an embodiment, the spacer 18 may be made out of a series of thin layers which slide against each other. This allows a thick spacer 18 to have fairly tight bends without changing overall thickness.

Having a known spacing between the reference layer and sliding layers assists in obtaining accurate data. Ensuring the spacing can be accomplished by different methods. As discussed above with respect to FIG. 1, retainers 22 can be affixed to one strip and provide compressive force to the other strip that slides against it as shown. The retainers 22 may be plastic or elastic pieces that provide a compressive force to the reference strip 14 and the sliding strip 12. The compressive force should be such that it maintains the distance but does not inhibit movement of the reference strip 14 and the sliding strip 12. In an embodiment, elastomeric sleeves can be used to achieve the same task, providing compressive force.

At the end portion 16, the sliding strip 12 and the reference strip 14 are secured together. In an embodiment, the sliding strip 12 and the reference strip 14 are mechanically attached together. In an embodiment, the sliding strip 12 and the reference strip 14 are integrally secured to each together. In an embodiment, the sliding strip 12 and the reference strip 14 are secured at a location other than the distal end. In an embodiment, the sliding strip 12 and the reference strip 14 are secured in the middle of the strip. Elsewhere along the lengths of the sliding strip 12 and the reference strip 14, the sliding strip 12 and the reference strip 14 slide with respect to each other. The sliding strip 12 and the reference strip 14 also slide against the spacer 18 relative to each other. The retainers 22 ensure that the sliding strip 12 and the reference strip 14 remain pressed against the spacer 18 so as to keep a constant distance between them. Circuitry 24 and electrical connections between the strips are outside of the sensing area where the bending occurs. In the embodiment shown in FIGS. 1 and 2, the circuitry 24 is located proximate to end portion 16 where the sliding strip 12 and the reference strip 14 are joined. The sliding strip 12 and the reference strips 14 contain patterns of electrodes 20 that will allow the electronics to detect the relative shift between the two strips at many locations by measuring the coupling from electrodes 20 on the sliding strip 12 and the electrodes 20 on the reference strip 14 through the spacer 18.

The embodiment discussed above may be made using the materials and techniques implemented to create flexible circuits. Flexible circuits may start with a flexible, insulating substrate such as polyimide. A thin conducting layer (such as copper, silver, gold, carbon, or some other suitably conducting material) is adhered to the substrate with an adhesive. In an embodiment, the conducting layer is patterned using photolithographic techniques. In an embodiment, the conducting layer is applied by sputtering. In an embodiment, the conducting layer is applied by printing. When applied via printing, conductive ink can be directly patterned onto the substrate.

Similar to rigid printed circuit boards (PCBs), flexible circuits can be manufactured to include multiple conductive layers, separated by insulators. Vias may provide connections among the different layers. Like rigid PCBs, standard electrical components may be affixed to flexible circuits using soldering and other well-known techniques. However, because some components are not flexible, flexing their attachments may lead to broken electrical connections. For this reason, flexible circuits may employ stiffeners in the area of components, so that the region of the circuit does not appreciably flex. For similar reasons, flexible circuits tend not to place vias in regions that are actually bending since the stresses in those areas may sometimes lead to breakage.

Many electrode patterns for the multibend sensor can benefit from the use of interlayer connections in bending regions. Dupont® has developed special conductive inks that are explicitly designed to withstand repeated flexure. However other suitable flexible conductive inks may be used as well. These inks can be implemented in the multibend sensors discussed herein. Flexible inks permit flexible connections between conductive layers, serving the role of vias. It should be noted that these flexible conductive inks are compatible with a wide range of substrates, including fabric. This allows for the construction of multibend sensors that are directly integrated into clothing. Additionally, in an embodiment clothing is made from fibers that function as multibend sensors. When implementing multibend sensor fibers stiffeners may be added in order to restrict the movement of the multibend sensor fibers.

Figure 3:
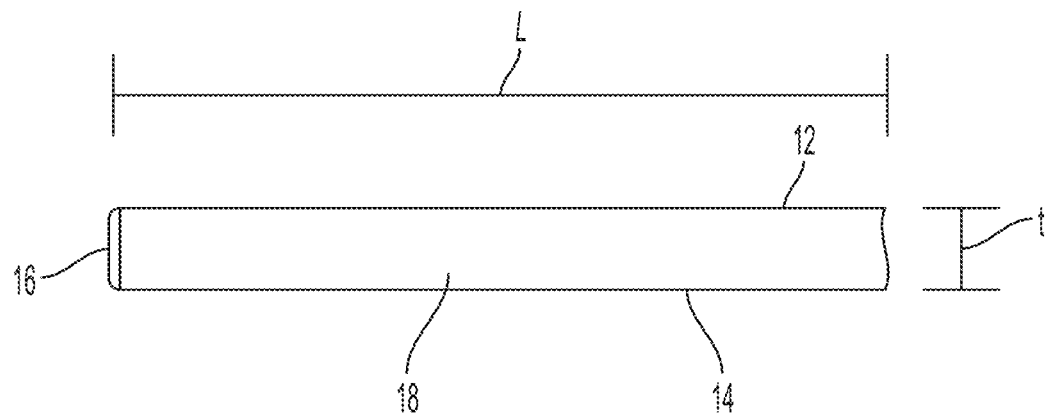
FIG. 3 is a schematic view of a sliding and a reference sensor strip.
Figure 5:
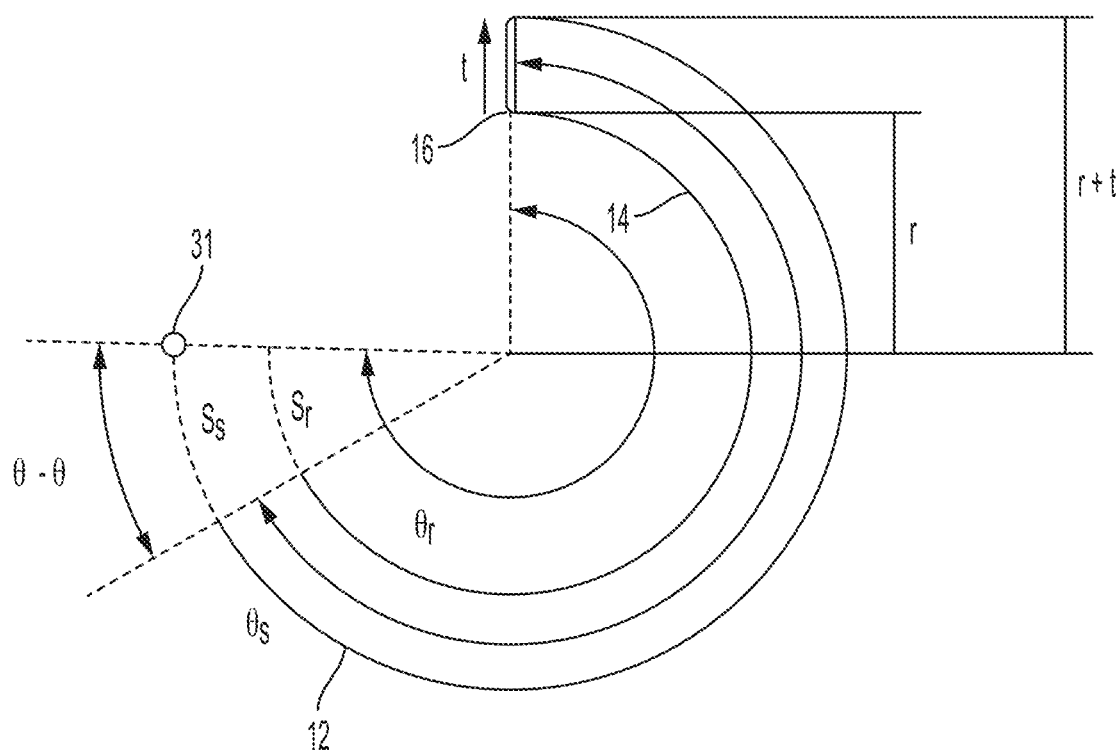
FIG. 5 is a diagram illustrating a sliding strip wrapped around a spacer.

In the following discussion, a multibend sensor comprising a sliding strip and a reference strip may be analogized to a pair of measuring tapes of length L, separated by a spacer of thickness t as shown in FIG. 3. Similar to the binding of a book, in an embodiment, the strips are joined together on one end. In an embodiment, when the strips are in a flat orientation, the imaginary distance markings of the measuring tapes perfectly align. However, if the pair is formed around a cylinder of radius r, the inner tape measure will be formed into a circular arc of radius r, while the outer tape measure will be formed into a circular arc of radius r+t (as shown in FIG. 5 and discussed in more detail below). Because they are conjoined on one end, the zero markings of the two tape measures will still align, but the other markings will get progressively misaligned. This is because it takes more tape to subtend the same angle on a larger radius. In an embodiment, when a multibend sensor is formed around a circular arc, the radius r can be calculated knowing only the spacing and the relative shift between the tape measures. In an embodiment, relative shift can similarly be measured at many points along the sensor, each allowing us to measure the curvature of successive segments. In this way, we can measure complex curves that are well modelled as a series of circular arcs.

Figure 4:
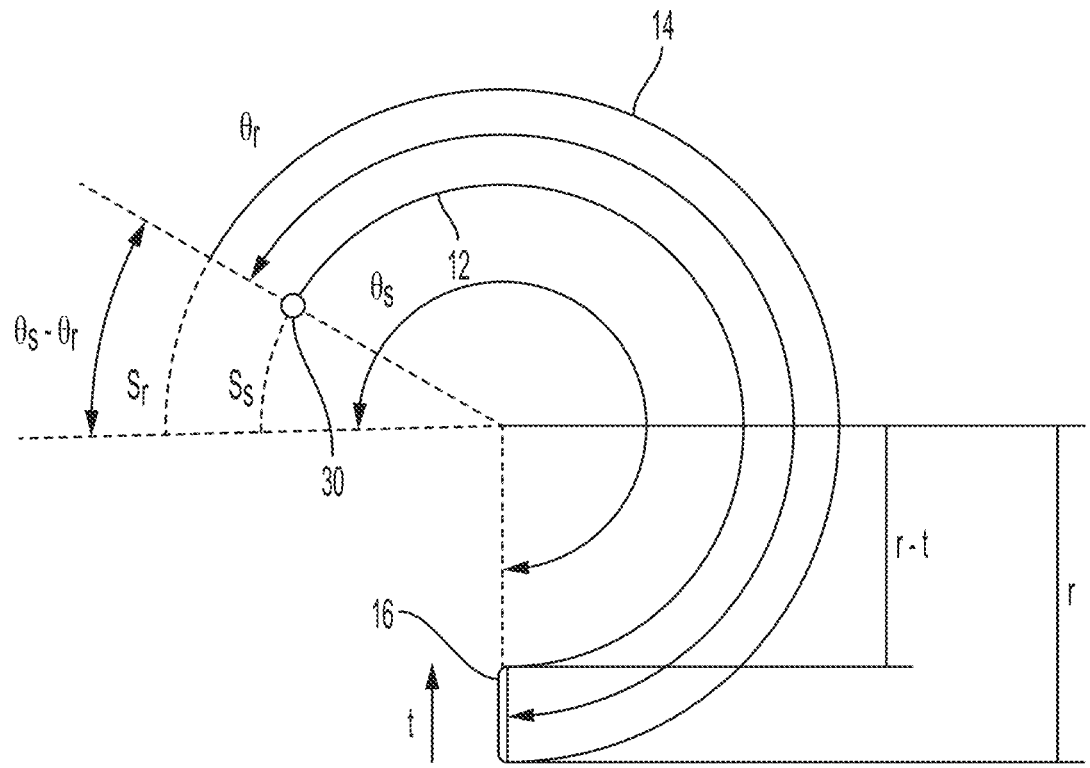
FIG. 4 is a diagram illustrating a reference strip wrapped around a spacer.

Referring now to FIGS. 3-5, when the multibend sensor is wrapped around an object in a circle, the inner of the two strips conforms to the circle, while the outer strip conforms to a slightly larger circle due to the thickness of the spacer 18.

Because the two strips have different radii of curvature, the unconstrained ends will not align with each other. By knowing the length of the strips, sliding strip 12 and reference strip 14 and the thickness of the spacer 18, the radii can directly be calculated. If the relative shift between the two strips is measured at many places, a model of the bend as a series of circular arcs can be constructed. This provides a much better understanding of the shape of the bend as opposed to traditional sensors.

Still referring to FIGS. 3-5, to illustrate the way in which the multibend sensor works, take two strips of length L, the sliding strip 12 and the reference strip 14 separated by a spacer 18 of thickness t. The sliding strip 12 and the reference strip 14 are joined together at end point 16 and cannot move relative to one another at that end. When the reference strip 14 is wrapped into a circle of radius r as shown in FIG. 4, the reference strip 14 will have a radius of curvature of r, while the sliding strip 12 will have a smaller radius of r−t.

The circumference of the circle is $2\pi r$. The reference strip 14, which is of length L, covers a fraction of the circle:

$$\frac{L}{2\pi r}$$

To put it in terms of radians, the angle subtended by this strip is:

$$\theta_r = \frac{L}{r}$$

As shown in the diagram, when curled in the direction of the thickness measurement t, the sliding strip 12 ends up on the inside, with a smaller radius of curvature. The tighter wrap means that some of the sliding strip 12 extends beyond the end of the reference strip 14. If this continues along a circle of the same radius, the sliding strip 12 subtends an angle of:

$$\theta_s = \frac{L}{r-t}$$

The end of the reference strip 14 lines up with a corresponding point 30 on the inner sliding strip 12. To give a more precise definition, it is the intersection point on the sliding strip 12 to the normal constructed through the endpoint of the reference strip 14.

This point can be found on the sliding strip 12 by finding the difference in the angular extent of the two arcs, finding the extending length $s_s$ and subtracting this from the total length L.

$$\theta_s - \theta_r = \frac{L}{(r-t)} - \frac{L}{r} = \frac{Lt}{r(r-t)}$$

The length of the segment $s_s$ of the sliding strip 12 that extends past the reference strip 14 can be found by dividing the angular extent in radians by $2\pi$ to find the fraction of the circle and multiplying by the circumference.

$$s_s = \frac{Lt}{r(r-t)} \frac{1}{2\pi} 2\pi (r-t) = L\frac{t}{r}$$

Solving these equations for the radius r gives:

$$r = t\frac{L}{s_s}$$

By measuring the relative shift between the strips, the radius of curvature across the length can be calculated using this simple equation.

Now consider the case where bending occurs in a clockwise direction as shown in FIG. 5.

The analysis proceeds much as before, but now the sliding strip 12 is on the outside, with a radius of curvature of r+t.

$$\theta_r = \frac{L}{r}$$

$$\theta_s = \frac{L}{r+t}$$

As before, the goal is to locate the corresponding point 31 on the sliding strip 12 that corresponds to the endpoint of the reference strip 14. However, because the sliding strip 12 is on the outside and thus subtends a smaller angle the arc has to be continued to find the intersecting point. $s_s$ is calculated by finding the angle subtended and the corresponding length on the sliding strip 12.

$$\theta_r - \theta_s = \frac{L}{r} - \frac{L}{(r+t)} = \frac{Lt}{r(r+t)}$$

$$s_s = \frac{Lt}{r(r+t)} \frac{1}{2\pi} 2\pi (r+t) = L\frac{t}{r}$$

This is the same result as obtained in the counterclockwise case. The difference here is that $s_s$ in the first case is the amount the sliding strip 12 extended past the reference strip 14, and in this case, it is the amount extra that would be needed to reach the end of the reference strip 14.

To combine these two cases, consider the radius of curvature to be a signed quantity, with a positive r indicating an arc which proceeds in a counterclockwise direction and a negative r indicating a clockwise direction.

A new variable, $L_s$ is defined as the total length along the sliding strip 12 to line up with the end of the reference strip 14. The signed radius of curvature is:

$$r = t\frac{L}{L - L_s}$$

In FIG. 4, $L_s$<$L$, gave a positive radius of curvature. In FIG. 5, $L_s$>$L$, gives a negative radius of curvature. The signed radius of curvature is then used to find the signed angular extent of the reference strip.

$$\theta_r = \frac{L}{r} = \frac{L - L_s}{t}$$

In the following, all angles and radii of curvature are signed.

Reconstructing the Curve from Shift Measurements

In an embodiment, the multibend sensor models shape as a series of circular arcs of different radii to allow for complex curves. By measuring the relative shift at many points along the strips, the curvature of each segment can be quickly determined.

Figure 6:
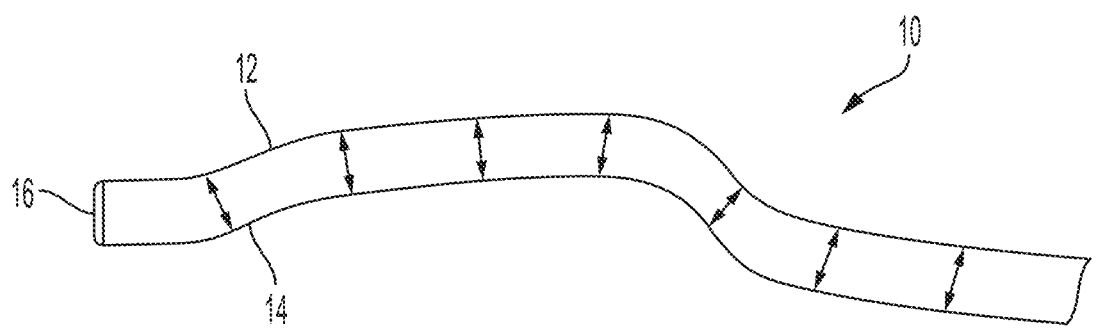
FIG. 6 is another view of a sensor strip formed from a sliding strip and a reference strip.

The multibend sensor 10 shown in FIG. 6 comprises a sliding strip 12 and a reference strip 14. Finding the shape of the reference strip 14 is the goal. At fixed intervals along the reference strip the corresponding shifted position along the sliding strip 12 is measured. By corresponding, it is meant that points that lie at the same angle with respect to the common center of the radius of curvature are used. Another way to say this is that if a normal to the curve of the reference strip 14 is constructed at the measurement point, a measurement will be made where it intersects the sliding strip 12.

Figure 7A:
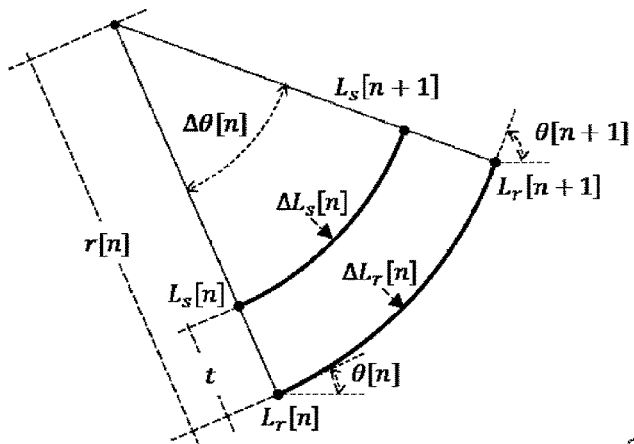
FIG. 7A is a diagram illustrating the calculations of a segment.

Referring now to FIG. 7A, a single circular arc segment that spans from n to n+1 (segment n) on both the reference strip 14 and sliding strip 12 is provided as an example. Segment n is shaped into a circular arc of radius r[n] in a counterclockwise direction. Thus, the reference strip 14 has radius r[n] while the sliding strip is inside with a smaller radius of r[n]−t. Starting angle θ[n] is the tangent at the beginning of the arc. The ending angle is the tangent to the arc at its end, θ[n+1]. Similar to the calculation above, $L_r$[n] is the length of the reference strip 14 to measurement point n. $L_s$[n] is the length of the sliding strip 12 to measurement point n. On the side of the reference strip 14, the segment begins at L[n] and ends at $L_r$[n+1]. Similarly, the corresponding sliding strip 12 extends from L[n] to L[n+1]. The signed radius of curvature and the signed angular extent of the reference strip 14 segment can be found.

We define the length of the reference strip 14 in segment n as:

$$\Delta L_r[n] = L_r[n+1] - L_r[n]$$

and the length of the corresponding sliding strip as:

$$\Delta L_s[n] = L[n+1] - L[n]$$

Similarly, we define the total subtended angle of this segment as:

$$\Delta\theta[n] = \theta[n+1] - \theta[n]$$

For the case of positive curvature (r[n]>0 and Δθ[n]>0), the sliding strip 12 is shaped into a tighter curve than the reference strip 14. Thus, $\Delta L_s[n] < \Delta L_r[n]$, even though they subtend the same angle, Δθ[n]. Working in radians, the length of the reference segment is:

$$\Delta L_r[n] = r[n]\Delta\theta[n]$$

and the length of the corresponding sliding segment is:

$$\Delta L_s[n] = (r[n] - t)\Delta\theta[n]$$

Given the two lengths and the spacer thickness, we can solve for the radius of curvature of this segment:

$$r[n] = \frac{t\Delta L_s[n]}{\Delta L_r[n] - \Delta L_s[n]}$$

This same equation applies when the curve proceeds clockwise, giving a negative ending angle and negative radius of curvature. We can also solve for the subtended angle of the arc:

$$\Delta\theta[n] = \frac{\Delta L_r[n] - \Delta L_s[n]}{t}$$

A series of circular arcs of known length, angular extent, and radius of curvature is now known. This series can be pieced together to model the complete curve of the reference strip 14. It will be noted that, in an embodiment, multibend sensors have continuous flexure along their length and, thus, they are inherently continuous in their first derivative. Therefore, to maintain a continuous first derivative from segment to segment, the tangents of adjoining segments match. To put this another way, the ending angle of each segment matches the starting angle of the next segment.

Figure 7B:
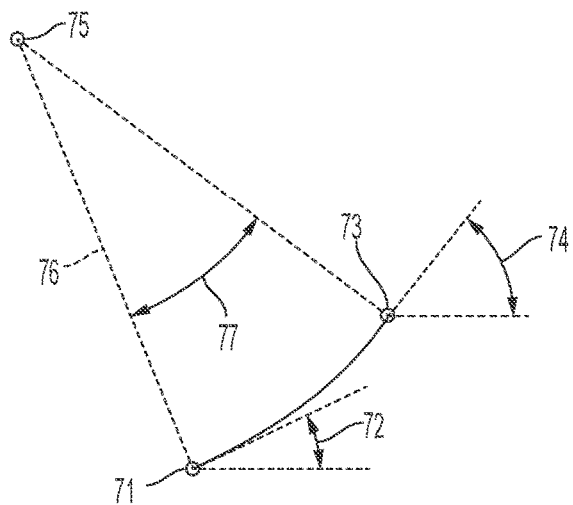
FIG. 7B is a diagram illustrating the calculations of a segment.

Consider a single arc as shown in FIG. 7B. A starting angle 72, θ[n], and an ending angle 74, θ[n+1], which are tangent to the arc at its endpoints can be determined. It can be presumed that sequential segments connect smoothly—i.e. that the derivative is continuous at the point of connection. This is why the connection points are described by a single tangent angle.

The arc begins at a known starting point 71, (x[n], y[n]), and at an initial known angle 72 of θ[n] and proceeds to an unknown ending point 73, (x[n+1], y[n+1]), at an unknown ending angle 74 of θ[n+1].

The change in angle from starting point to the ending point is just the turning of the segment angle, Δθ[n]. To find the x, y translation, the increment in x and y over the arc is added to the previous point. For convenience, the center of the radius of curvature of the arc is considered to be at the origin and used to calculate endpoint positions. The difference in these is then applied to the known starting point.

For this calculation, the angles from the center that form the arc are known. The normal to θ[n] is $$\theta[n] - \frac{\pi}{2}.$$

For an arc of positive radius of curvature, this gives the angle pointing out from the center of the radius of curvature. If the radius of curvature is negative, it points in the opposite direction. This results in a sign flip that is corrected by using the signed radius of curvature. The endpoints can then be found iteratively via these equations:

$$x[n+1] = x[n] + r[n]\cos\left(\theta[n+1] - \frac{\pi}{2}\right) - r[n]\cos\left(\theta[n] - \frac{\pi}{2}\right)$$

$$y[n+1] = y[n] + r[n]\sin\left(\theta[n+1] - \frac{\pi}{2}\right) - r[n]\sin\left(\theta[n] - \frac{\pi}{2}\right)$$

These equations can be slightly simplified using trig identities.

$$x[n+1] = x[n] + r[n](\sin(\theta[n+1]) - \sin(\theta[n]))$$

$$y[n+1] = y[n] + r[n](\cos(\theta[n]) - \cos(\theta[n+1]))$$

These equations describe the series of circular arcs that model the bend. A circular arc is typically described by its center 75, ($C_x[n]$, $C_y[n]$), its radius of curvature 76, $r[n]$, a starting angle, and an angular extent 77, $\theta_r[n]$.

The center of an arc segment can be found by starting at ($x[n]$, $y[n]$), and following the radius to the arc center ($C_x[n]$, $C_y[n]$). The starting angle is found from the normal at the point ($x[n]$, $y[n]$), which is $$\theta[n] - \frac{\pi}{2}.$$

The center is then:

$$C_x[n] = x[n] + r[n]\cos\left(\theta[n] - \frac{\pi}{2}\right) = x[n] + r[n]\sin(\theta[n])$$

$$C_y[n] = y[n] + r[n]\sin\left(\theta[n] - \frac{\pi}{2}\right) = y[n] - r[n]\cos(\theta[n])$$

Note that the use of the signed radius of curvature ensures following the normal to the center.

The starting angle is:

$$\left(\theta[n] - \frac{\pi}{2}\right)\text{sign}(r[n])$$

The sign is needed to flip the angle if the arc proceeds clockwise. The extent of the arc is $\theta_r[n]$, which is also a signed value.

Sensitivity to Measurement Error

Any real measurement of shift will be imperfect, making it important to understand how measurement errors impact the accuracy of the modelled curve. In jointed arms, noisy measurements of joint angles quickly accumulate, causing significant errors in the final position of the end effector. For instance, on multi-axis robot arms, position is usually determined via a series of encoders—one on each joint. High precision encoders are typically required because any errors in each joint measurement accumulate. For a planar arm, the angular error at the end of the arm is simply the sum of all the measurement errors in each joint. The location error of the endpoint is also wildly impacted by all of the joint errors-particularly the ones at the beginning of the arm.

Measurement errors in the multibend sensor are more forgiving. In an embodiment, error propagation is mitigated because measurement errors for each arc are not independent.

Consider the case of a single shift measurement error at the nth point. Compared to the ideal, the shifted point will cause an error in the radius of curvature of two adjacent segments. The error on one segment will be one direction, while the error on the other segment will be in the opposite direction, tending to cancel things out to first order. This property, of segment errors tending to create somewhat compensating errors, holds in general and is a consequence of the shift measurements which give the total accumulated shift to that point.

To show the sensitivity to error, take the example of two successive segments with the coordinates:

($x[0]=0,y[0]=0$),($x[1],y[1]$),($x[2],y[2]$)

Ideal measurements for $L_r[n]$ and $L_s[n]$ are given. However, $L_s[1]$ will be perturbed by a measurement error of $\delta$. How this error propagates to ($x[2]$, $y[2]$) is then found.

In the unperturbed case (and noting that $\theta[0]=0$):

$$x[1] = x[0] + r[n](\sin(\theta[1]) - \sin(0)) = x[0] + r[n]\sin(\theta[1])$$

$$y[1] = y[0] + r[n](\cos(0) - \cos(\theta[1])) = y[0] + r[n](1 - \cos(\theta[1]))$$

$$r[n] = t\frac{L_r[n+1] - L_r[n]}{(L_r[n+1] - L_r[n]) - (L_s[n+1] - L_s[n])}$$

$$\theta_r[n] = \frac{(L_r[n+1] - L_r[n]) - (L_s[n+1] - L_s[n])}{t}$$

$$\theta[n+1] = \theta[n] + \theta_r[n]$$

Equally spaced measurement points, 1 unit apart are presumed.

$L_r[n+1] - L_r[n] = 1$ for all $n$

Apostrophes are used to indicate the variables for the case with measurement error $\delta$ at $L_s[1]$. This allows the resulting angles with and without mid-point measurement error to be.

$$r[0] = t\frac{1}{1 - (L_s[1])}$$

$$r'[0] = t\frac{1}{1 - (L_s[1] + \delta)}$$

$$r[1] = t\frac{1}{1 - (L_s[2] - L_s[1])}$$

$$r'[1] = t\frac{1}{1 - (L_s[2] - L_s[1] - \delta)}$$

$$\theta_r[0] = \frac{1 - L_s[1]}{t}$$

$$\theta'_r[0] = \frac{1 - (L_s[1] + \delta)}{t}$$

$$\theta_r[1] = \frac{1 - (L_s[2] - L_s[1])}{t}$$

$$\theta'_r[1] = \frac{1 - (L_s[2] - L_s[1] - \delta)}{t}$$

$$\theta[0] = 0$$

$$\theta[1] = \theta_r[0] = \frac{1 - L_s[1]}{t}$$

$$\theta'[1] = \theta'_r[0] = \frac{1 - (L_s[1] + \delta)}{t}$$

$$\theta[2] = \theta[1] + \theta_r[1] = \frac{1 - L_s[1]}{t} + \frac{1 - (L_s[2] - L_s[1])}{t} = \frac{2 - L_s[2]}{t}$$

$$\theta'[2] = \theta'[1] + \theta'_r[1] = \frac{1 - (L_s[1] + \delta)}{t} + \frac{1 - (L_s[2] - L_s[1] - \delta)}{t} = \frac{2 - L_s[2]}{t}$$

This shows that the ending angle after two arcs is unimpacted by a misreading in the middle point. The angle error does not propagate.

The error in the point locations are considered.

$$x[n+1] = x[n] + r[n](\sin(\theta[n+1]) - \sin(\theta[n]))$$

$$y[n+1] = y[n] + r[n](\cos(\theta[n]) - \cos(\theta[n+1]))$$

$$x[1] = r[0](\sin(\theta[1])) = t\frac{1}{1 - (L_s[1])}\sin\left(\frac{1 - L_s[1]}{t}\right)$$

$$y[1] = r[0](1 - \cos(\theta[1])) = t\frac{1}{1 - (L_s[1])}\left(1 - \cos\left(\frac{1 - L_s[1]}{t}\right)\right)$$

$$x'[1] = r'[0](\sin(\theta'[1])) = t\frac{1}{1 - (L_s[1] + \delta)}\sin\left(\frac{1 - (L_s[1] + \delta)}{t}\right)$$

-continued $$y'[1] = r'[0](1 - \cos(\theta'[1])) = t\frac{1}{1-(L_s[1]+\delta)}\left(1 - \cos\left(\frac{1-(L_s[1]+\delta)}{t}\right)\right)$$

$$x[2] = x[1] + r[1](\sin(\theta[2]) = \sin(\theta[1])) = t\frac{1}{1-(L_s[1])}\sin\left(\frac{1-L_s[1]}{t}\right) +$$

$$t\frac{1}{1-(L_s[2]-L_s[1])}\left(\sin\left(\frac{2-L_s[2]}{t}\right) - \sin\left(\frac{1-L_s[1]}{t}\right)\right)$$

$$y[2] = y[1] + r[1](\cos(\theta[1]) - \cos(\theta[2])) =$$

$$t\frac{1}{1-(L_s[1])}\left(1 - \cos\left(\frac{1-L_s[1]}{t}\right)\right) +$$

$$t\frac{1}{1-(L_s[2]-L_s[1])}\left(\cos\left(\frac{1-L_s[1]}{t}\right) - \cos\left(\frac{2-L_s[2]}{t}\right)\right)$$

$$x'[2] = x'[1] + r'[1](\sin(\theta'[2]) - \sin(\theta'[1])) =$$

$$t\frac{1}{1-(L_s[1]+\delta)}\sin\left(\frac{1-(L_s[1]+\delta)}{t}\right) +$$

$$t\frac{1}{1-(L_s[2]-L_s[1]-\delta)}\left(\sin\left(\frac{2-L_s[2]}{t}\right) - \sin\left(\frac{1-(L_s[1]+\delta)}{t}\right)\right)$$

$$y'[2] = y'[1] + r'[1](\cos(\theta'[1]) - \cos(\theta'[2])) =$$

$$t\frac{1}{1-(L_s[1]+\delta)}\left(1 - \cos\left(\frac{1-(L_s[1]+\delta)}{t}\right)\right) +$$

$$t\frac{1}{1-(L_s[2]-L_s[1]-\delta)}\left(\cos\left(\frac{1-(L_s[1]+\delta)}{t}\right) - \cos\left(\frac{2-L_s[2]}{t}\right)\right)$$

Using these equations, the endpoint error under different conditions can be plotted. It is clear that position error at the end of the first segment is somewhat compensated for by an oppositely signed error in the next segment.

Further consider the case of a multibend sensor with two measurement points. The curvature of the first segment is found by determining the relative shift at the first measurement point. In this example, the measurement is corrupted by noise and an incorrectly low shift reading is recorded. The relative shift of the second segment is then found by taking the total shift at the second measurement point and subtracting off the shift from the first measurement point. The error at the first point will now cause a corresponding error in the second segment that is opposite in sign from the error in the first segment. Thus, the two segments will end up with curvature errors that tend to cancel each other out. In an embodiment, the error in final angle is completely unimpacted by the error at the first measurement point.

To show the sensitivity to error, we revisit the example of two successive segments. We define the starting point of the curve as:

$x[0]=0$ $y[0]=0$ $\theta[0]=0$

By definition, $\Delta L_r[0]=0$ and $L_s[0]=0$. We can now calculate the ending angle of segment 0:

$$\theta[1] = \Delta\theta[1] + \theta[0]$$

$$= \Delta\theta[0]$$

$$= \frac{\Delta L_r[0] - \Delta L_s[0]}{t}$$

$$= \frac{L_r[1] - L_s[1]}{t}$$

Next, we find the ending angle of segment 1.

$$\theta[2] = \Delta\theta[1] + \theta[1]$$

$$= \frac{\Delta L_r[1] - \Delta L_s[1]}{t} + \frac{L_r[1] - L_s[1]}{t}$$

$$= \frac{L_r[2] - L_s[2]}{t}$$

As can be seen, the ending angle calculation has no dependence on any earlier measurements. This means that any errors in earlier measurements do not contribute error in the ending angle of each segment.

While the embodiment and examples discussed above uses arcs in performing the analysis, other measurement techniques and analyses may be employed. In an embodiment, ellipses are used for approximating the curves. In an embodiment, analysis of the curves may be performed using parabolas. In an embodiment, splines are used for approximating a curve. In an embodiment, a polynomial function is used for approximating the curve. In an embodiment, all of the methodologies discussed herein are used in approximating the curve.

As will be noted by those skilled in the art, the above noted results prove advantageous over traditional solutions that build upon a series of angular encoders which have a practical limit on the number of encoders that can be strung together.

Another possible model of a curve is to represent it as a series of connected straight linear segments.

Figure 8:
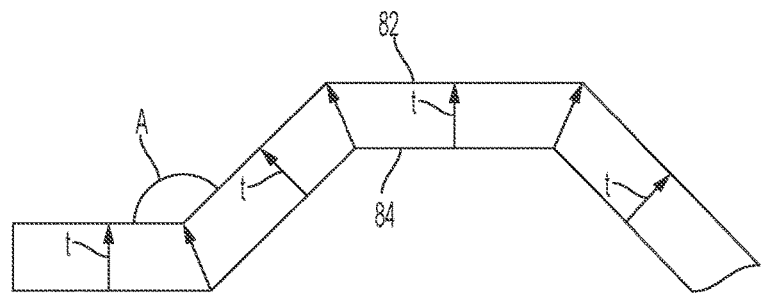
FIG. 8 is a diagram illustrating using a linear segment analysis for the curves.
Figure 9:
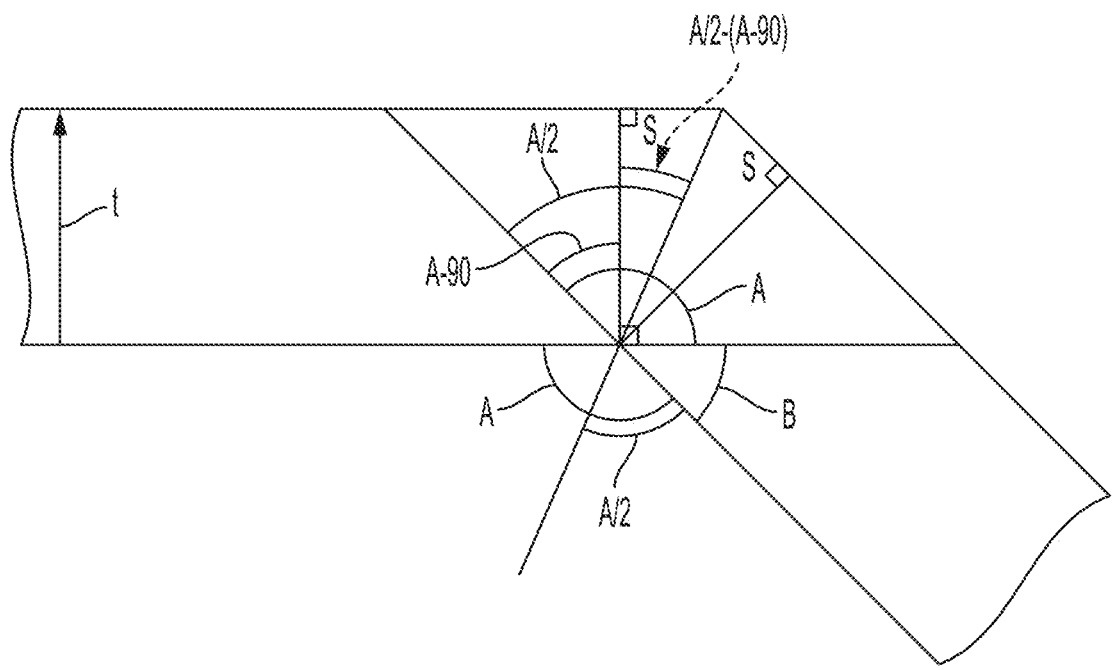
FIG. 9 is a diagram illustrating the determination of angles in the linear segment analysis.

Referring to FIGS. 8 and 9, for a piecewise linear model, the bends are presumed to be perfectly sharp, and occur only at fixed intervals on a reference strip 84. The sliding strip 82 will be presumed to conform to a fixed distance from the reference strip 84. This will create corresponding sharp bends for each bend of the reference strip 84. Bending towards the reference strip 84 will mean that extra length will be needed on the sliding strip 82 to conform to the new shape. Similarly, bending towards the sliding strip 82 will take less length to conform.

The calculation is begun by calculating the extra length required on the sliding strip 82 given a bend toward the reference strip 84. Looking towards FIG. 9, the multibend sensor has a bend of angle A. The vertically opposite angle is also A. The extra length of the sliding strip 82 needed to conform to the bend is shown as 2s. The two bend points bisect the bend angle. The vertically opposite angle is also $$\frac{A}{2}.$$

With the right angle construction, the A−90 angle is found by subtracting the right angle. Finally the angle opposite s is computed as $$\frac{A}{2} - (A - 90).$$

The tangent of the angle is equal to the opposite side length (s) divided by the adjacent side length (t).

$$\tan\left(\frac{A}{2} - (A - 90)\right) = \frac{s}{t}$$

$$s = t * \tan\left(90 - \frac{A}{2}\right)$$

$$s = t * \cot\left(\frac{A}{2}\right)$$

And for the total length added:

$$2s = 2t * \cot\left(\frac{A}{2}\right)$$

This formula is also correct for when the bend angle exceeds 180, and bends up towards the sliding strip 82. In this case the additional length is negative.

For convenience, the bending angle, B, can be defined relative to no bend being 0.

$B = 180 - A$ $A = 180 - B$

Substituting in:

$$s = t * \tan\left(90 - \frac{B}{2}\right) = t * \tan\left(90 - \frac{(180-B)}{2}\right) = t * \tan\left(\frac{B}{2}\right)$$

$$2s = 2t * \tan\left(\frac{B}{2}\right)$$

Given a measurement of shift, the angle that would have given rise to it is calculated.

$$B = 2 * \arctan\left(\frac{s}{t}\right) \text{ where } s \text{ is the half shift}$$

Like the circular arc model, this piecewise linear model still has the general behavior of measurement error in one shift measurement creating a complimentary error in the next, partially canceling out the impact of potential additive error.

Consider an ideal measurement vs one where there is measurement error in the first segment.

Ideal measurements: $s_1$ and $s_2$

Measurements with error: $s_1 + d, s_2 - d$ $$B_1 = 2 * \arctan\left(\frac{s_1}{t}\right)$$

$$B_2 = 2 * \arctan\left(\frac{s_2}{t}\right)$$

The resulting angle of the last segment is simply the sum of the angle to that point.

$$B_{total} = B_1 + B_2 = 2 * \arctan\left(\frac{s_1}{t}\right) + 2 * \arctan\left(\frac{s_2}{t}\right)$$

Repeating the calculation with measurement error:

$$B_{total\_err} = 2 * \arctan\left(\frac{s_1}{t} + \frac{d}{t}\right) + 2 * \arctan\left(\frac{s_2}{t} + \frac{d}{t}\right)$$

These total bends are not the same, however, it can be shown via series expansion around d=0 that the errors cancel to first order.

Capacitive Sensing Techniques

Capacitive sensing can be used with a multibend sensor and is the methodology discussed above with respect to FIGS. 1-2. For example, looking to FIG. 10, a pattern of interdigitated electrodes 20 allows one to perform differential measurements by comparing the capacitance of overlapping electrodes 20 to determine relative shift. The differential nature of this measurement makes it highly insensitive to various types of error. In addition to the electrode pattern shown in FIG. 10, other electrode patterns can be implemented that will further provide measurements that can help determine the overall movement and shape of the multibend sensor.

Figure 10:
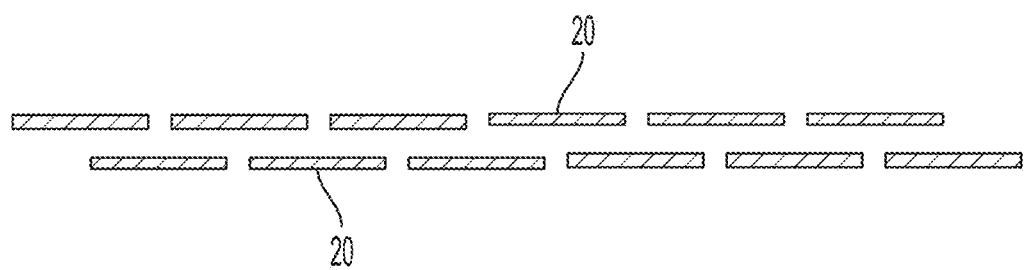
FIG. 10 is a diagram illustrating the spaced electrodes.

Still referring to FIG. 10, a plurality of the electrodes 20 are adapted to transmit signals and a plurality of the electrodes 20 are adapted to receive signals from the electrodes 20 that are transmitting signals. In an embodiment, the electrodes 20 adapted to transmit signals and the electrodes 20 adapted to receive signals may be switched or alternated depending on the implementations. In an embodiment, an electrode 20 adapted to transmit a signal may at a different time also be adapted to receive a signal. Received signals are used in order to determine movement of one strip with respect to the other strip.

In an embodiment, orthogonal frequency division multiplexing can be used with a multibend sensor employing a plurality of electrodes 20 that are adapted to receive and transmit orthogonal signals. In an embodiment, unique frequency orthogonal signals are used. In an embodiment, a unique frequency orthogonal signal is transmitted on each of the electrodes 20 that is transmitting. Electrodes 20 that are adapted to receive signals may receive the transmitted signals and process them in order to obtain information regarding the relative shift of the reference strip with respect to the sliding strip. This can then be used to determine the shape of the curve formed by the multibend sensor.

In general, the curvature of multiple dimensions can be determined by forming a mesh of reference strips and sliding strips with each multibend sensor determining its own respective curve. After the curve of each multibend sensor is determined the entire curvature of a plane can be modeled. In an embodiment, a plurality of multibend sensors may be placed on a three dimensional object that is subject to various deformations across its 3D surface. The plurality of multibend sensors may be able to accurately determine the curving deformation of a 3D object after reconstructing curvature taken from each of the multibend sensors.

In another embodiment, the strips are replaced with fibers that are flexible in 3 dimensions. These fibers are then packed around a central reference fiber such that the outer sliding fibers move relative to the reference fiber when bent. In an embodiment, spacers maintain a constant spacing between all the fibers. The relative shifts can be measured by a variety of means, including via patterned electrodes along the fiber.

In an embodiment the sensor may be created from narrow sheets that more closely resemble a flexible wire, being able to flex outside of the plane. If two of these devices are held together, sensing in orthogonal directions, flexing in and out of the plane can be measured.

Figure 11:
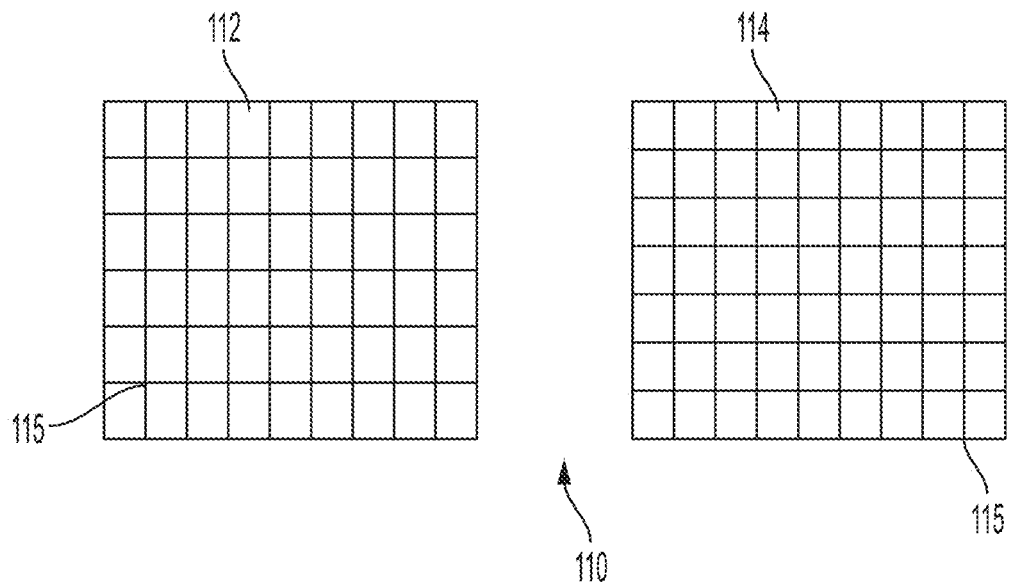
FIG. 11 is a diagram illustrating a multiplanar multibend sensor.

Another embodiment is shown in FIG. 11. This embodiment provides a multibend sensor 110 that is able to determine curvature in more than one planar direction. There is a sliding plane 112 and a reference plane 114. In FIG. 11 the planes are not shown on top of each other however, it should be understood that this is for ease of viewing the planes, sliding plane 112 and the reference plane 114 are positioned with respect to each other in a similar manner in which the strips discussed above are positioned. Electrodes 115 are placed on the sliding plane 112 and the reference plane 114. In FIG. 11, the electrodes 115 are formed as rows and columns. In an embodiment, the electrodes are formed as pads. In an embodiment, the electrodes are formed as dot antennas. There may additionally be a spacer plane placed between the sliding plane 112 and the reference plane 114 in order to establish a distance between the sliding plane 112 and the reference plane 114. In an embodiment, the reference plane 114 and the sliding plane 112 are implemented without a spacer layer with the electrodes 115 placed on the outward facing surfaces with the substrates of the planes functioning as a spacer layer. Furthermore, while there may be electrodes 115 placed on both planes, there may be transmitting electrodes placed on the sliding plane 112 and the reference plane 114 and receiving electrodes located at an interstitial region between the two planes. Also, the electrodes 115 can be either transmitting or receiving.

Still referring to FIG. 11, the sliding plane 112 and the reference plane 114 are flexible planes that are able to bend. The reference plane 114 and the sliding plane 112 are attached at various attachment points. Attachment points may be located at any location between the planes provided that they establish a reference location by which to ascertain the movement of one plane with respect to the other. In an embodiment, the attachment point may be the center location of the planes. In an embodiment, there are more than one attachment point from which relative movement of the planes is established. In an embodiment the planes are secured to each other at an edge. In an embodiment, the planes are secured at multiple points along the edge. In an embodiment, the planes are secured at points along an edge and within the area of the planes.

Figure 12:
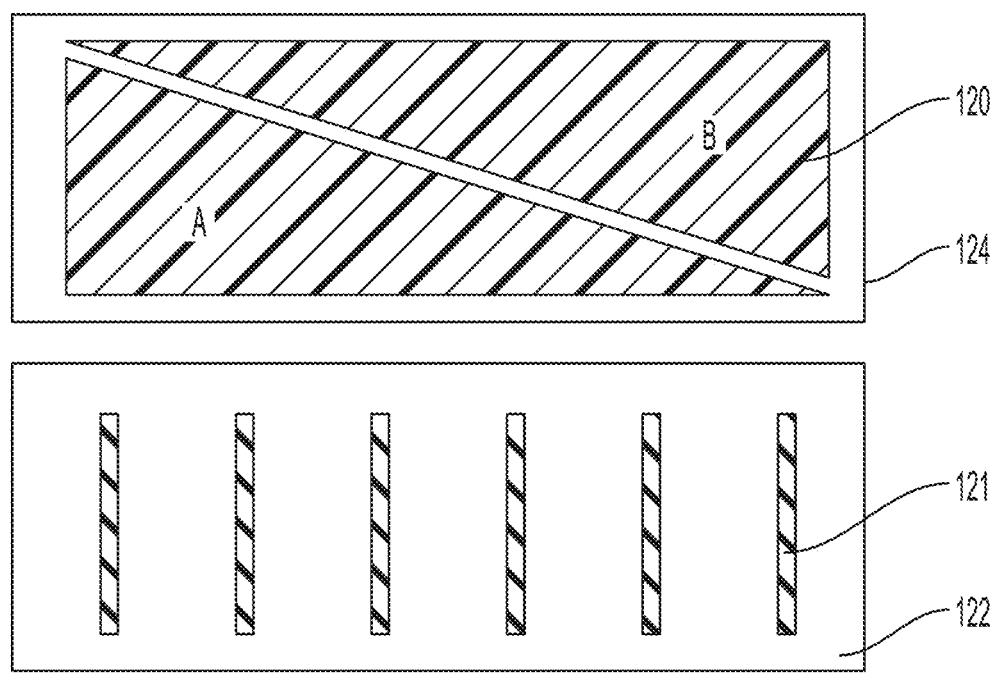
FIG. 12 is a diagram of a multibend sensor employing triangular electrodes and rectangular electrodes.
Figure 13:
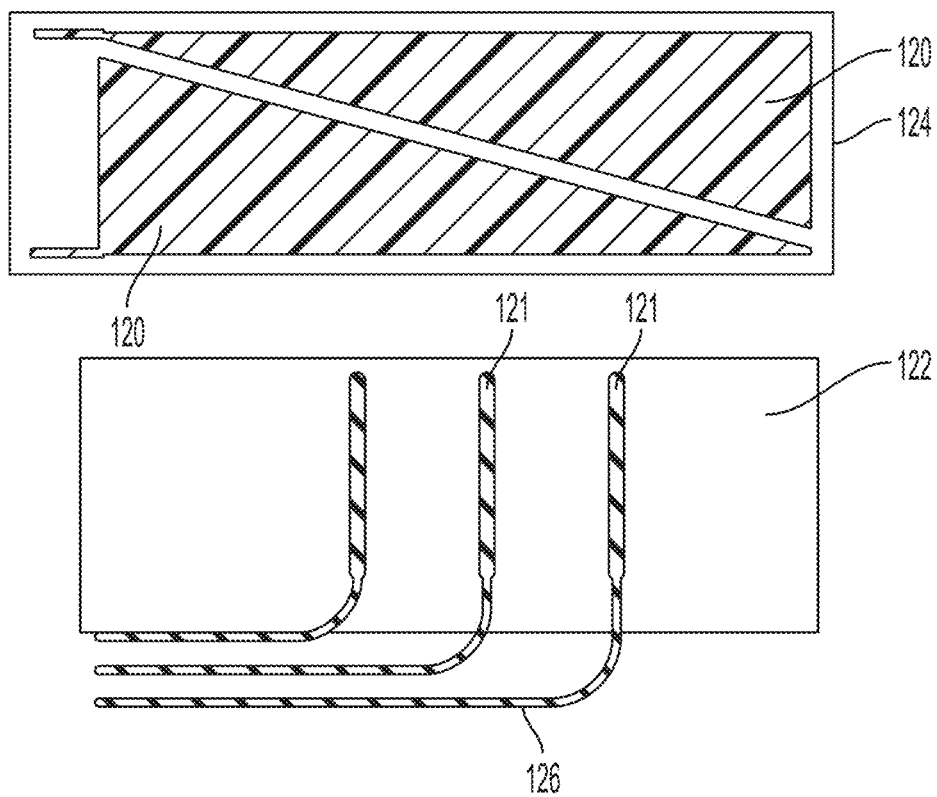
FIG. 13 is another diagram of a multibend sensor employing triangular electrodes and rectangular electrodes further illustrating connections.

Turning to FIGS. 12 and 13, another embodiment of a capacitive electrode design to measure relative shift is shown. While multilayer flex circuits are widely available, there are certain limitations to design that may be imposed. A common restriction is to not allow vias on bending sections. Therefore, patterns which do not require interlayer connections in bending areas are sometimes preferred.

FIG. 12 shows two triangular electrodes 120 that form the reference strip 124, and a series of rectangular electrodes 121 formed on the sliding strip 122. By measuring the relative capacitance to the A electrode 120 and B electrode 120 for each of the rectangular electrodes 121 on the sliding strip 122, the relative position of the rectangular electrodes 121 can be determined.

This pattern shown in FIGS. 12 and 13 does not require multiple layer connections. On the reference strip 124, connections can be directly made from either end. The rectangular electrodes 121 on the sliding strip 122 can be made via bus 126 as shown in FIG. 13. In an embodiment, shielding can be employed around the rectangular electrodes 121 and the triangular electrodes 120. Shielding can assist in mitigating interference. Electrodes that are transmitting can be surrounded by ground and receiving electrodes can be driven with an active shield in order to mitigate interference.

The design shown in FIGS. 12 and 13 is sensitive to slight rotations between the reference strip 124 and the sliding strip 122. For example, if the spacing is greater on the top versus the bottom, it may cause a systematic error. This can be corrected by calibration. Sensitivity can also be ameliorated by using a less sensitive pattern.

Figure 14:
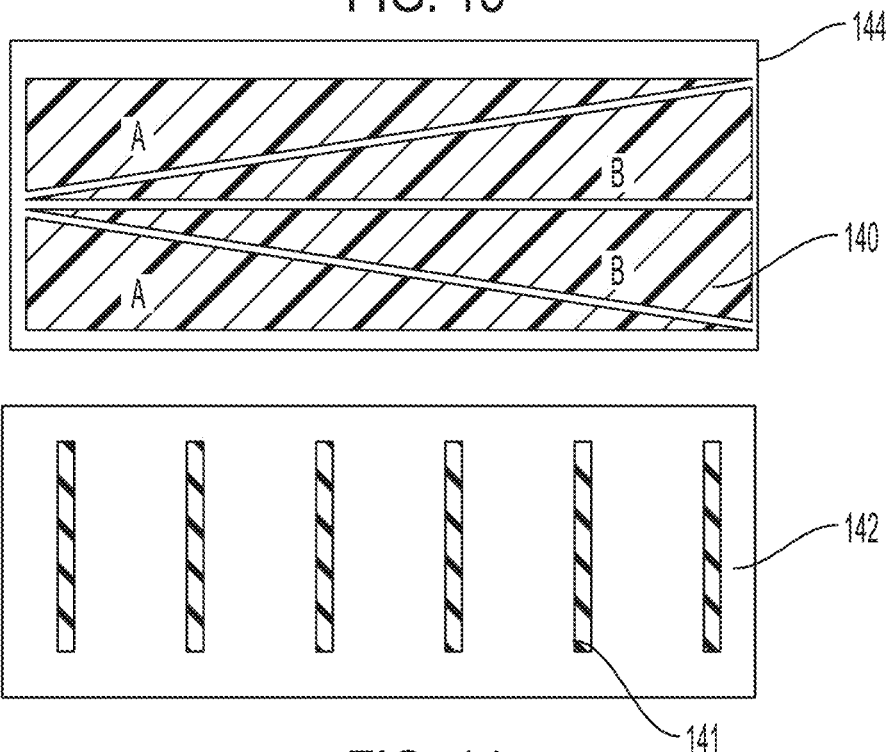
FIG. 14 is a diagram of a multibend sensor employing triangular electrodes and rectangular electrodes.

An example of a pattern with reduced sensitivity is shown in FIG. 14. The pattern shown in FIG. 14 employs additional triangular electrodes 140 placed on the reference strip 144. Rectangular electrodes 141 are placed on the sliding strip 142. The electrode pattern shown in FIG. 14 is symmetric about the centerline of the reference strip 144. This reduces the sensitivity as compared to the pattern shown in FIG. 12. The reduced sensitivity occurs because the triangular electrode 144 is further away on one side and closer on the other side. This distance roughly balances out the impact of any tilt that may exist.

Figure 15:
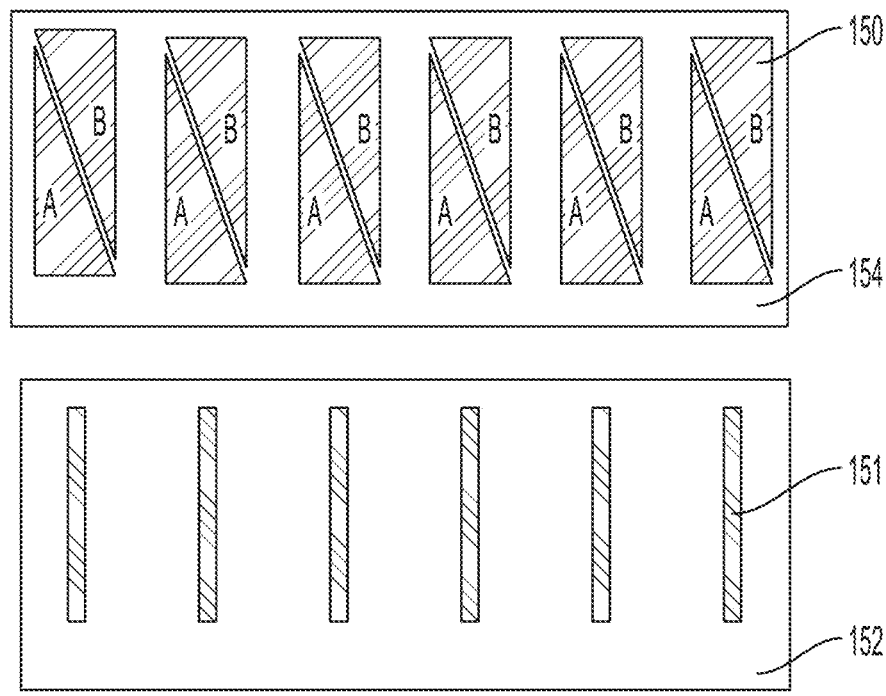
FIG. 15 is another diagram of a multibend sensor employing triangular electrodes and rectangular electrodes.

FIG. 15 shows another embodiment of sensor electrodes. FIG. 15 shows an arrangement of a reference strip 154 and sliding strip 152. The reference strip 154 has a plurality of triangular electrodes 150. The sliding strip 152 has a plurality of rectangular electrodes 151. In comparison to the electrode pattern shown in FIG. 12, the pattern in FIG. 15 replicates that arrangement of triangular electrodes 150. The angled pattern is replicated on a smaller scale in the neighborhood of each measurement to improve resolution. The sensor pattern shown in FIG. 15 can also be combined with shielding and symmetry techniques.

Figure 16:
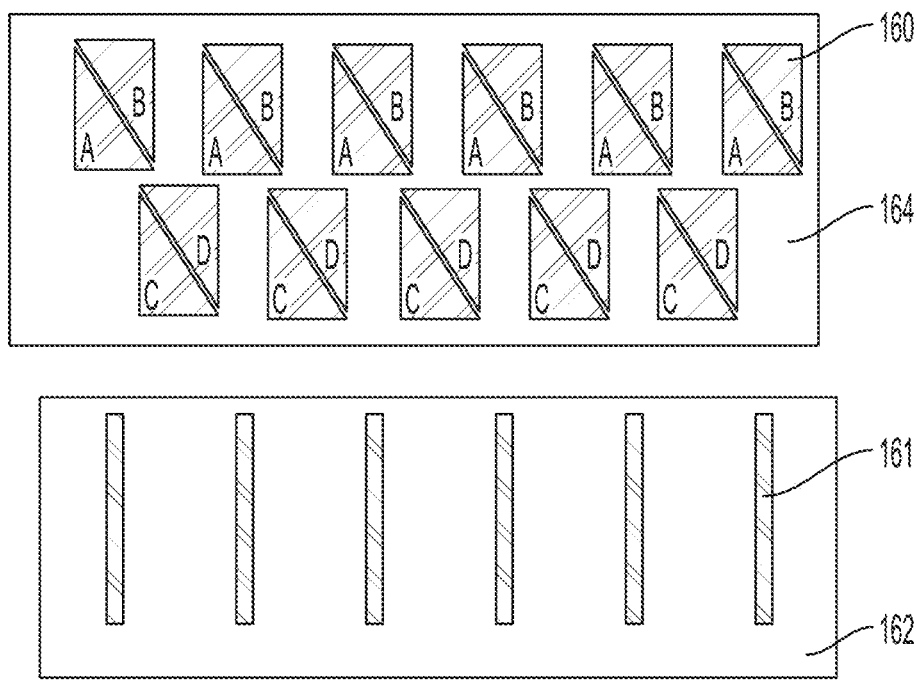
FIG. 16 is another diagram of a multibend sensor employing triangular electrodes and rectangular electrodes.

FIG. 16 shows another embodiment of sensor electrodes. FIG. 16 shows an arrangement of a reference strip 164 and sliding strip 162. The reference strip 164 has a plurality of triangular electrodes 160. The sliding strip 162 has a plurality of rectangular electrodes 161. In comparison to the electrode pattern shown in FIG. 12, the pattern in FIG. 16 replicates that arrangement of triangular electrodes 160. The angled pattern is replicated on a smaller scale in the neighborhood of each measurement so as to improve resolution. The sensor pattern shown in FIG. 16 can also be combined with shielding and symmetry techniques. When shifting causes a rectangular electrode 161 to get near the end of a triangular electrode 160, some nonlinearity will result. A way to address this is to use multiple sets of the triangular electrodes 160. The sets are shifted so that when a rectangular electrode 161 is near an edge on one triangular electrode 160, it is not at an edge on another of the triangular electrode 160.

Optical

In addition to capacitive based sensing, multibend sensors can be created using optical techniques rather than capacitive. Instead of interdigitated electrodes, optical transmitters and receivers can be used. Signals can be transmitted through an optically transmissive spacer located between a reference strip and sliding strip. Waveguide techniques permit the electronics to be placed at one end, rather than distributing them along the sensor.

Using standard flex circuit techniques, it is possible to place standard electro-optic components such as LEDs and photodiodes on a flexible strip. However, because these components are not in and of themselves flexible, local stiffening at the measurement point may be needed. Certain techniques may be used to work around the issue of local stiffening. In general, flexible electronics can be applied to the manufacture of multibend sensors (e.g. doing local electric field sensing, and reporting data back via a shared bus). In particular, the availability of OLEDs and other optic devices in a flexible form makes it possible to build distributed optical encoders along a flexible strip.

Flexible waveguides may also be employed to bring the optical signal to and from the measurement points distributed along the strips. In this way, the optoelectronics can be gathered at one location. For example the optoelectronics can be placed at the end where the strips are joined. At this location a rigid PCB can hold the electro-optic components.

Additionally, to cut down on the required number of optical connections, multiplexing techniques can be employed. For example, each sense location could employ optical filters so that different colors of light, different polarizations, or some combination of these are active at different locations along the multibend sensors, and can be distinguished at the end with the opto-electronics.

These systems have a path for light to travel from one strip to the other. This can be accommodated several different ways. In an embodiment, the spacer may be made from transparent materials. In an embodiment, slots may be provided in the neighborhood of the measuring spots. In an embodiment, the spacer may maintain an air gap between the strips. In an embodiment, the optical fibers may have nicks that permit light to bleed from one cable to another. In an embodiment, there may be bundles of optical fibers that are tied in the middle wherein the relative shift of both ends of the bundles are able to be determined.

Figure 17:
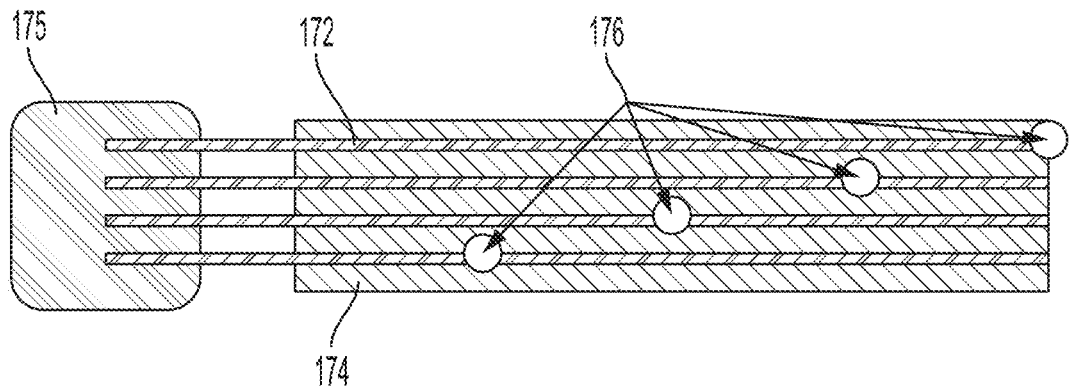
FIG. 17 is a diagram showing the use of parallel strips with a camera chip.

Referring to FIG. 17, inexpensive camera chips also can be used to make multibend sensors. These chips could be used at various points along the strips so as to measure shift. Still referring to FIG. 17, multiple, parallel sliding strips 172 are used that attach to a reference strip 174 at staggered attachment points 176. The ends of these sliding strips 172 can then extend to be observed by a camera chip 175. A single camera can thus track the motion of multiple slide strips 172 with high precision, effectively giving the same result as measuring the shift at different locations.

While flexible electronics are an option, there are other options for distributing optoelectronics along a flexible strip. In an embodiment, a rigid PCB may be attached to a flexible strip via elastic members. In this way, the strip can still bend freely, while the floating electro-optic module looks toward the encoder markings on the other flexible strip. To help maintain alignment, the electro-optic module can be designed to have a larger optical area that looks through a smaller aperture in the flexible strip. Even if the rigid PCB slightly wiggles with respect to the strip, the measurement will always be done with respect to the aperture in the strip.

Figure 18:
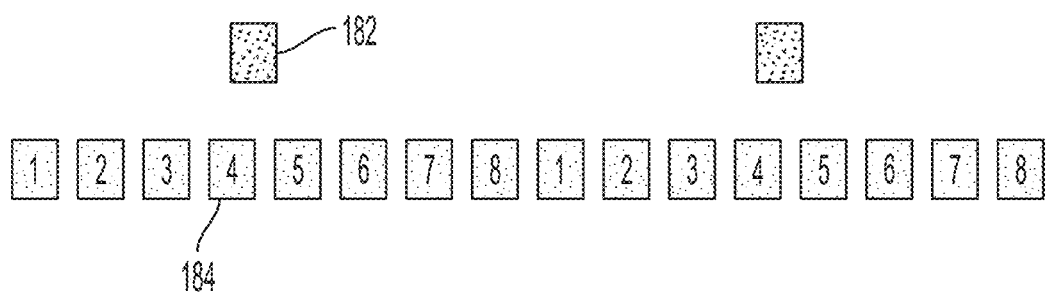
FIG. 18 is a diagram showing an electrode pattern for a sensor that is able to determine wrapping.

When sensing shift, there is a question of how much shift must one sense before running out of range. Looking to the arrangement of receiving electrodes 182 and transmitting electrodes 184 shown in FIG. 18 an example of shifting range can be explained. In this case, there are a small number of receiving electrodes 182 that are placed on a sliding strip, and a larger number of transmitting electrodes 184 placed on a reference strip. Instead of providing unique signals on every transmitting electrode 184, signals are reused periodically. Each of the numbered transmitting electrodes 184 representing a different signal. If the shift is limited to the region of one set of transmitting electrodes 184, the position can be uniquely determined. If the shift is greater than this, the shift reading is not uniquely determined by the closest transmitting electrode 184. In this instance it could have shifted so much as to have wrapped into the next set of transmitting electrodes 184. Because a sequence of measurements is made along the strips, the combined shift from earlier segments can be seen and is likely to indicate that a wrap has occurred. Because incremental unwrapping can occur, the constraint is not on any particular receiving electrode 182 staying within range of one set of transmitting electrodes 184. It is only limited by the ability to unwrap. If it is known that the number of transmitting electrodes 184 between successive receiving electrodes 182 is limited to +/−half the number of receiving electrodes 182 nominally between transmitting electrodes 184 one can uniquely determine the position of the next segment because it is known which transmitting electrodes 184 could be within the range of the previous segment. More sophisticated techniques can extend this even further for example, by making assumptions about higher order derivatives. Although this technique is explained in the context of a capacitive sensor, the same technique can be applied to other embodiments. Using the optical multistrip setup, instead of just detecting an end, the strip can have repeated variations which are detected and analyzed to find a precise position. It is possible to use calibration targets with many edges to allow the positions to be determined by combining data of all of them.

Other Methodologies

Above, capacitive and optical techniques were discussed, however, other mechanisms may be employed. For example, similar to a potentiometer, one strip can serve as a distributed resistor, and the other may have multiple wipers that make contact at numerous points along the resistive strip. The voltage at each wiper can be arranged to indicate the relative position along the resistive strip. A resistive strip is located on one strip, and a voltage placed across it. This creates a voltage gradient along the strip that is position dependent. Wipers along the top strip make sliding contact with the strip, sensing the voltage at their location. The wrapping detection discussed above can be achieved by having a separate potentiometer formed in the region of each wiper to allow more precise measurements. Mechanically, the wipers could also play a role in maintaining the spacing between the layers since they are spacers in and of themselves.

An improvement on the above design is rather than having a single resistive stripe along the strip, separate ones may be placed in the neighborhood of each wiper. Then each smaller resistive stripe could have the entire voltage gradient over a much smaller displacement, greatly increasing the resolution of the measurement. It should be noted that the number of connections to the strip with the resistive stripes is still only two.

Rather than mechanical wipers, other methods can be employed to create shift-dependent resistivity changes. For example, magneto-resistive materials change resistance in the presence of a magnetic field. A resistive trace, running parallel to a conductor could be effectively bridged at different locations including magneto-resistive material between these traces, which can be selectively made more conductive by a magnet on the other strip.

Another embodiment employs a series of magnets on one strip and Hall effect sensors on the other in order to measure shift. Time domain techniques may also be utilized to measure length. Time domain reflectometry techniques in either the electrical, optical or acoustic domain can be used to measure shift at multiple points. To use these, the measurement points create a path for signal to return. Magneto strictive position transducer methods may also be used to measure shift.

In an embodiment, inductive proximity sensing can be employed. The inductance of a coil will change in response to certain materials being within proximity to them. For example, in an embodiment, one strip carries a series of coils, while the other has sections of different magnetic permeability that are detected by the coils. The detection can be done a number of ways, including noting the change in inductance of each coil independently, or looking for the change in coupling among different coils. It is also possible to have coils on both strips, and measure the coupling between them. Linear Variable Differential Transformers (LVDTs) can be straightforwardly applied to this type of measurement.

In an embodiment, electromagnetic coupling can be utilized using radio frequency (RF) coupling between the strips.

In an embodiment, multibend sensors are designed for remote interrogation via RF. A simple tank circuit (LC) is used where either the L or C are dependent on the relative shift between strips. This type of circuit can be created on the strips using only patterning of conductive material. The resonant frequency of the tank circuit is dependent on relative shift, and can be read remotely using standard RFID techniques. The strips can be designed so as to contain multiple resonances that are each dependent on the local relative shift. If the resonances are reasonably separated in frequency, a remote frequency scan can reveal the change in each resonance independently. With the addition of active components, other techniques, such as time domain multiplexing can be employed to read the shift over multiple points.

Magnetic sensors (Hall effect, Giant Magnetoresistive, etc.) can be used to measure local magnetic fields. A pattern of magnetization of one strip could be detected on the other to determine relative shift at many points. Magnetic circuits can be employed to bring the flux measurement to a convenient physical location. High magnetic permeability material serves to channel the flux similar to a conductive wire carrying electric current. Using these techniques, a number of magnetic sensors can be positioned on the conjoined end of the strips, making measurements at various points along the strips.

Magnetostrictive transducers have been employed for measuring position in harsh industrial environments. The position of a moving magnet is determined by pulsing current in a magnetostrictive element, which causes a mechanical impulse to be generated in the element in the region of the magnet. The time for this impulse to propagate back to a measurement point is a function of the position of the magnet. In an embodiment, magnets are placed on one strip, and magnetostrictive material is placed on the other.

Analogous techniques can be employed using photoconductive materials. A light on the sliding strip can shift the location of bridging. This could be an LED or other light source mounted on the strip, or a simple aperture through which a separate light source is allowed to selectively pass.

Some of the measurement error propagation properties of the multibend sensor can be obtained on more traditional arm/encoder systems through mechanical means. Parallel linkages are often used to maintain the parallelity of two members.

Figure 19:
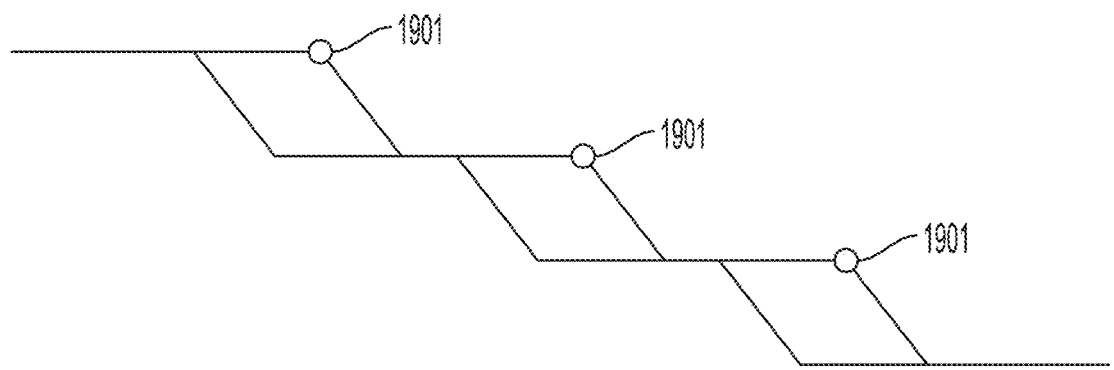
FIG. 19 is a diagram of mechanical multibend sensor.

FIG. 19, shows three sets of parallel linkages that guarantee that the horizontal lines remain parallel to each other. The dots 1901 represent encoders. The angle measured at each encoder is always with respect to the top line. In this way, measurement errors at each encoder do not propagate in measuring the absolute exit angle at each encoder. Various combinations of gears, belts and other linkages can be employed to similar effect.

The above discussed multibend sensors provide curvature data along its length. This data can be used in more sophisticated ways to give more detailed models. For example, one can interpolate or fit a higher order function to model the change in curvature along the sensor, and thus create a model with effectively many more segments. One could also change the underlying model of a segment from a circular arc to a different functional form.

The above described embodiments of the multibend sensor can accurately determine the shape of a curve or curved surface. Some applications of this technique may be in determining the positioning of robotics systems. In an embodiment the multibend sensor is used for pliable interfaces. In an embodiment the multibend sensor is used for human joint motion rehabilitation. In an embodiment the multibend sensor is used for human joint motion in virtual reality. In an embodiment, the multibend sensor is used for determining curvature of a back, movement of a head, or bending of legs. In an embodiment the multibend sensor is used for measuring complex curves. In an embodiment the multibend sensor is used for complex vibration understanding and active control. In an embodiment the multibend sensor is used for automotive, tires and seat deformation. In an embodiment the multibend sensor is used for posture monitoring. In an embodiment the multibend sensor is used for expressive musical instrument interfaces. In an embodiment the multibend sensor is used for tank/pressure bladder monitoring for deformations such as bubbling out (e.g. monitoring planes, submarines etc.).

The multibend sensor may also be used in understanding the shape of a pressurized system. For example, airplanes with pressurized cabins undergo significant stress and deformation as they are repeatedly pressurized and depressurized. If a particular area becomes weakened through repeated stress, it will begin to bubble out (or in, depending on which side you are looking at) relative to other areas. The multibend sensor is employed so as to detect this for understanding the rate of system fatigue, and where failures may be imminent. Submarines, holding tanks, and all sorts of pressurized containers have similar issues that can benefit from the application of the multibend sensor. In an embodiment, the multibend sensor is used in assisting with oil and gas exploration when determining the curvature of bits.

Other mechanical systems that deform under load can also benefit from the multibend sensor. Another advantage of the multibend sensors described above is that the precision arises from geometric relationships rather than from electrical properties that are susceptible to changes due to environmental condition and are subject to aging and wear, this makes the disclosed multibend sensors suitable for monitoring bridges, support beams, etc. over the life of the structure.

Another advantage of the multibend sensors described above is that the precision arises from geometric relationships rather than from electrical properties that are susceptible to changes due to environmental conditions and subject to aging and wear. Implementations of this application may employ principles used in implementing orthogonal frequency division multiplexing sensors and other interfaces disclosed in the following: U.S. Pat. Nos. 9,933,880; 9,019,224; 9,811,214; 9,804,721; 9,710,113; and 9,158,411. Familiarity with the disclosure, concepts and nomenclature within these patents is presumed. The entire disclosure of those patents and the applications incorporated therein by reference are incorporated herein by reference. This application may also employ principles used in fast multi-touch sensors and other interfaces disclosed in the following: U.S. patent application Ser. Nos. 15/162,240; 15/690,234; 15/195,675; 15/200,642; 15/821,677; 15/904,953; 15/905,465; 15/943,221; 62/540,458, 62/575,005, 62/621,117, 62/619,656 and PCT publication PCT/US2017/050547, familiarity with the disclosures, concepts and nomenclature therein is presumed. The entire disclosure of those applications and the applications incorporated therein by reference are incorporated herein by reference.

Physical Implementation

Figure 20A:
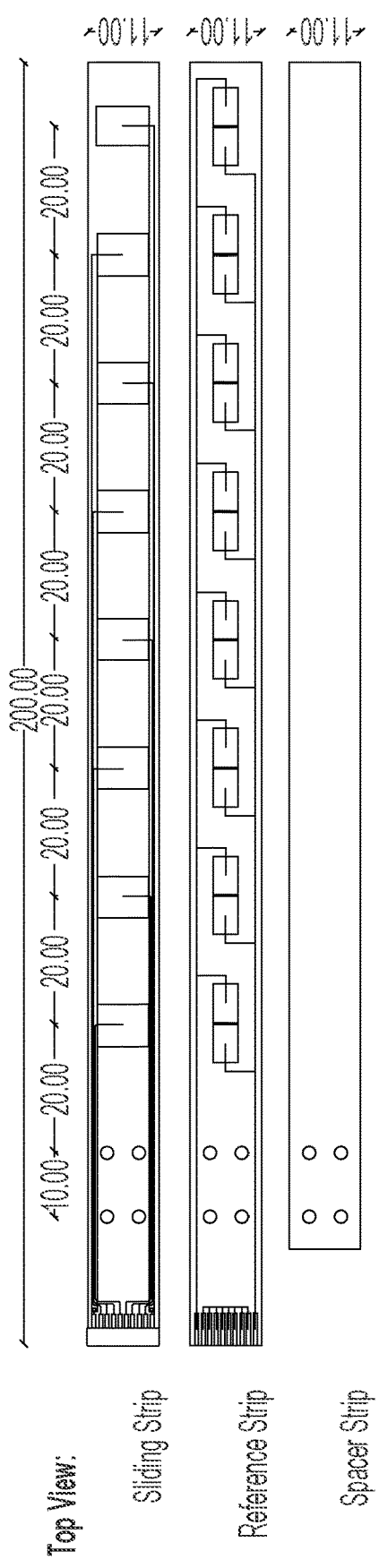
FIG. 20A shows a top view of a sliding strip, a reference strip, and a spacer strip of a multibend sensor.
Figure 20B:
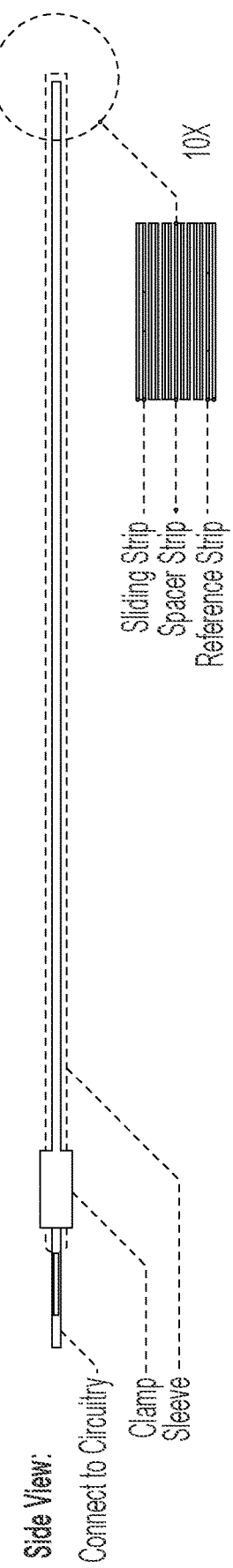
FIG. 20B shows a side view of the multibend sensor of FIG. 20A.

Referring now to FIGS. 20A and 20B, a reference strip and a sliding strip of a multibend sensor are provided. A plurality of transmit electrodes moves along a corresponding pattern of receive electrodes. In an embodiment, position is determined by examining the change in coupling capacitance between the transmit and receive electrodes. In an embodiment, a pattern of interdigitated electrodes allows one to perform differential measurements by comparing the capacitance of overlapping electrodes to determine relative shift. The differential nature of this measurement makes it highly insensitive to various types of error. As noted above, in addition to the electrode pattern shown in FIG. 20, other electrode patterns can be implemented that will further provide measurements that can help determine the overall movement and shape of the multibend sensor.

In an embodiment, a plurality of the electrodes are adapted to transmit signals and a plurality of the electrodes are adapted to receive signals from the electrodes that are transmitting signals. In an embodiment, the electrodes adapted to transmit signals and the electrodes adapted to receive signals may be switched or alternated depending on the implementations. In an embodiment, an electrode adapted to transmit a signal may at a different time also be adapted to receive a signal. Received signals are used in order to determine movement of one strip with respect to the other strip. In an embodiment, electrodes can be patterned on standard flexible printed circuit boards (PCB) when creating the reference strip and the sliding strip. The capacitance through the spacer can be measured, and relative position determined.

In an embodiment, the transmit strip has a plurality of equally spaced electrodes which align with an equal number of differential electrode pairs on the receive strip. When the strips are flat, each transmit electrode will be centered over a receive pair such that the differential capacitance is zero. As the two strips shift relative to each other, the transmit pads will move out of alignment with the receive pads, unbalancing the differential capacitance. In an embodiment, the electrodes are arranged as to have significant overlap to minimize the impact of skew and fringing fields, giving a linear change in differential capacitance with respect to shift.

In an embodiment, the transmit and receive pads are kept at a fixed spacing by interposing a plurality of polyimide strips. In an embodiment, the amount of shift is proportional to the thickness of the spacing. In an embodiment, the thickness is 0.5 mm. In an embodiment, a single spacer is used. In an embodiment, a plurality of spacers are used to maintain accurate spacing while allowing the device to be pliable.

In an embodiment, the strips are held pressed together via an elastic sleeve, while still allowing them to shift against each other along the length. In an embodiment, a clamp passes through alignment holes on the strips to constrain motion on that end. In an embodiment, gold finger contacts allow the strips to be inserted into connectors on opposite sides of a controller board. In an embodiment, the strips are integrally manufactured with a controller board.

FIGS. 21A and 21B show a perspective view and a side view, respectively, of a multibend sensor 2100. In an embodiment, the sliding strip and the reference strip are portions of a single continuous component that is then folded onto itself. In an embodiment at least one spacer is located between the sliding strip portion and the reference strip portion.

In an embodiment, the electrical connections for the electrodes (not shown) placed in the sliding and reference portions may be routed back through one or both ends of the continuous component to the circuitry. In an embodiment, the electrodes belonging to the sliding portion and those belonging to the reference portion are affixed to a continuous piece of material with all electrical connections routed to one or both ends. The continuous piece of material would then be folded and the ends secured to each other. In an embodiment, at least one spacer is placed between the sliding and reference portions and secured to the ends of the material.

Figures 22A, 22B, 22C:
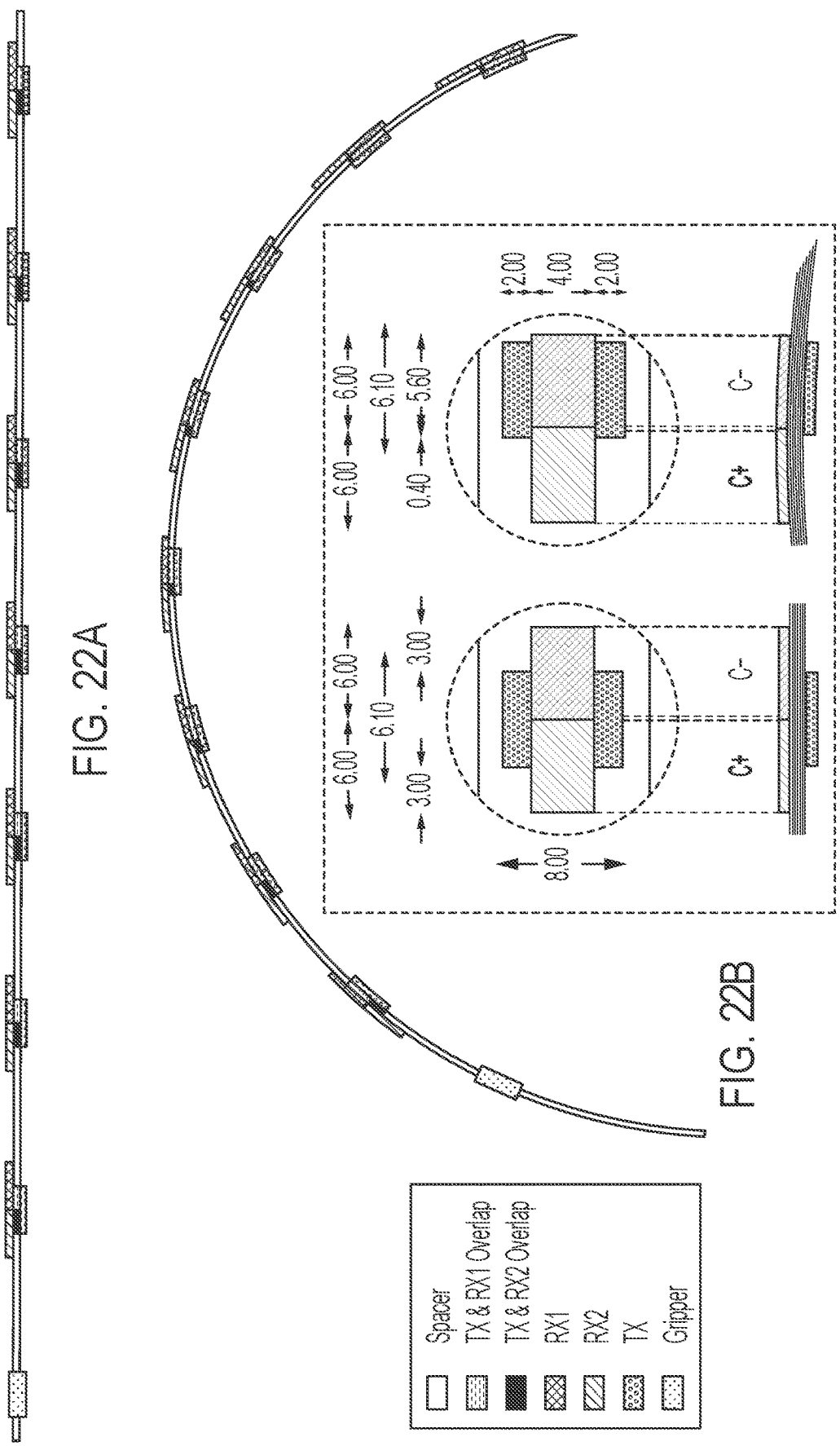
FIG. 22A illustrates a multibend sensor in a flat position.
FIG. 22B illustrates a multibend sensor in a bent position.
FIG. 22C illustrates representative electrode positions when a multibend sensor is in a flat position and in a bent position.

FIGS. 22A and 22B illustrate a multibend sensor in a flat position and a bent position, respectively. In an embodiment, the electrodes shift as the sensor is flexed. FIG. 22C illustrates the relationship between the relative shift and differential capacitance when the multibend sensor is in a flat position and in a bent position. In an embodiment, when the multibend sensor is in a flat position, the transmit electrodes are centered between two receive electrodes (i.e., no shift) and the differential capacitance is zero. In an embodiment, when the multibend sensor is bent in at least a portion of the sensor, at least one transmit electrode overlaps one receive electrode from the set of receive electrodes more than the other(s) receive electrode(s) (i.e., shift) creating a non-zero differential capacitance.

In an embodiment, a single channel, 24-bit differential capacitance to digital converter is used to perform the capacitance measurements. In an embodiment, using a series of ultra-low capacitance multiplexers, shift at 8 points along the strips can be successively measured. In an embodiment, the capacitances measured are sub-pico farad.

In an embodiment, when substantial parasitic capacitances due to the proximity of various traces are noted, a calibration procedure can be used. First, the static impact of the parasitic capacitances are measured when the sensor is laid flat. Then, this value is subtracted off of later readings to find the differential capacitance due to the electrodes. In an embodiment, the circuit can do a full sweep of the multibend sensor about 10 times per second, while drawing less than 100 mW.

Multicontour Sensor

Figure 23:
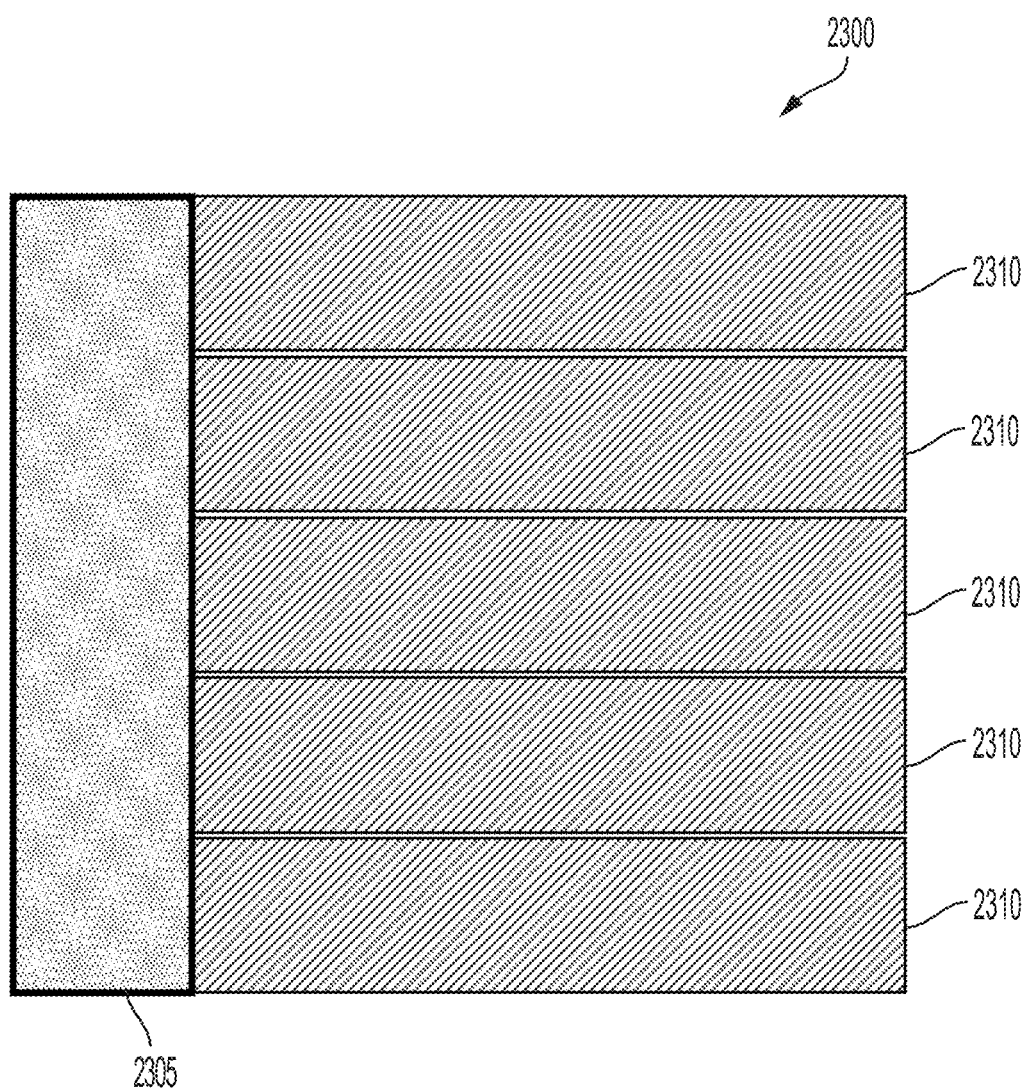
FIG. 23 is a diagram of a multicontour sensor.
Figure 24:
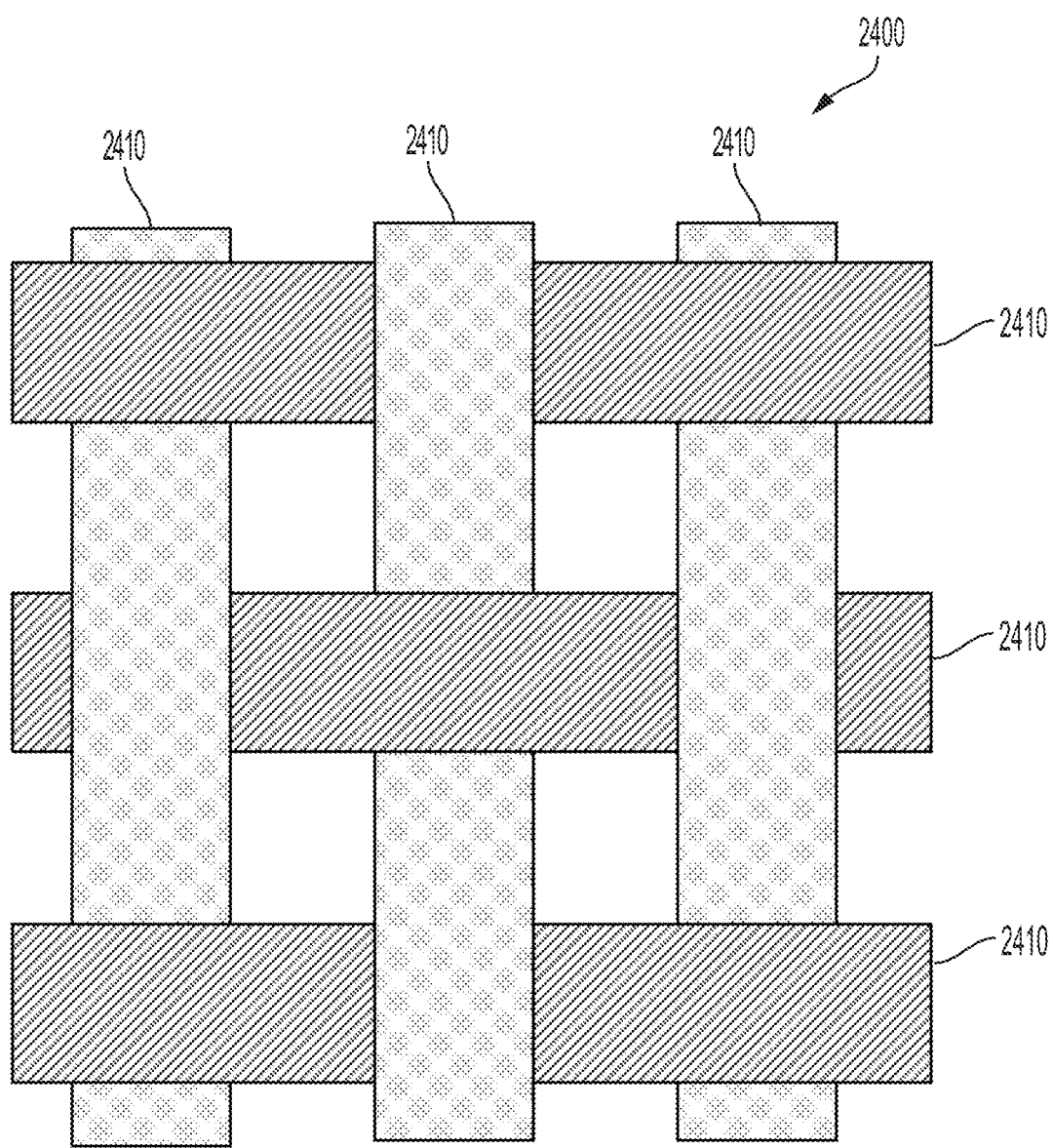
FIG. 24 is a diagram of a multicontour sensor.
Figure 25:
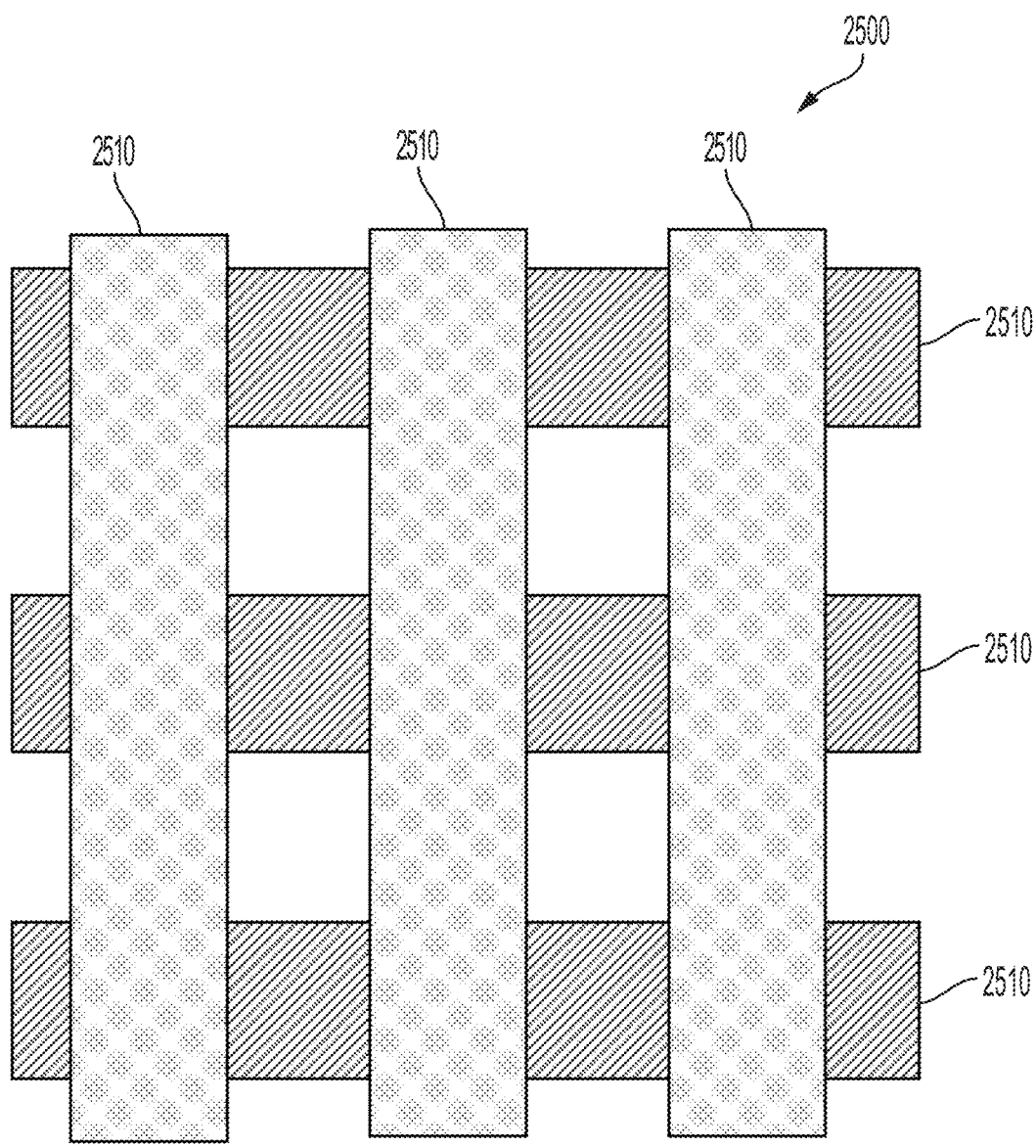
FIG. 25 is a diagram of a multicontour sensor.

Turning to FIGS. 23-25, shown is a multicontour sensor 2300 comprising a plurality of multibend sensors 2310—described in embodiments disclosed herein—secured to a housing 2305. As may be appreciated by those skilled in the art, the arrangement and positioning of the plurality of multibend sensors 2310 is non-limiting and may be selected to accurately describe or measure at least one of a surface, a contour, and a profile. In some embodiments, the arrangement and positioning of the plurality of multibend sensors 2310 may be selected to describe or measure a non-developable surface. As used herein, the term "developable" surface may mean at least one of: a smooth surface with zero Gaussian curvature, a surface that can be flattened onto a plane without distortion (i.e. "stretching" or "compressing"), and a surface that can be wrapped by a sheet of paper wherein the sheet of paper does not incur folds or crease. Further, as used herein, the term "non-developable surface" may mean at least one of: a surface that may have a non-zero Gaussian curvature, and a surface that cannot be flattened onto a plane without distortion.

Returning to FIG. 23, in an embodiment the plurality of multibend sensors 2310 may be arranged parallel to each other where the reference strips and the corresponding sliding strips of each of the plurality of multibend sensors 2310 move with respect to each other and with respect to the adjacent reference strips and sliding strips of adjacent multibend sensors 2310.

FIG. 24 illustrates an embodiment of a multicontour sensor 2400 comprising a plurality of multibend sensors 2410 arranged in an interwoven pattern with columns and rows. FIG. 25, illustrates an embodiment of a multicontour sensor 2500 comprising a plurality of multibend sensors 2510 overlaid in an arrangement such that all columns are above all rows or vice-versa.

In an embodiment, a multicontour sensor comprises a plurality of multibend sensors in different arrangements. In an embodiment, the plurality of multibend sensors are arranged at different angles with respect to each other and interwoven. In an embodiment, the plurality of multibend sensors are arranged in layers whereby each layer is angled with respect to each other. In an embodiment, the plurality of multibend sensors are arranged asymmetrically interwoven, layered, or angled with respect to at least one other multibend sensor.

As it may be noted by those skilled in the art, in comparison to the multibend sensor 110 embodiment illustrated in FIG. 11, the multicontour sensors described in this section are formed by arranging several multibend sensors to achieve a specific pattern as opposed to having sliding planes 112 and reference planes 114.

Seat Components with Multibend Sensors

Figure 26:
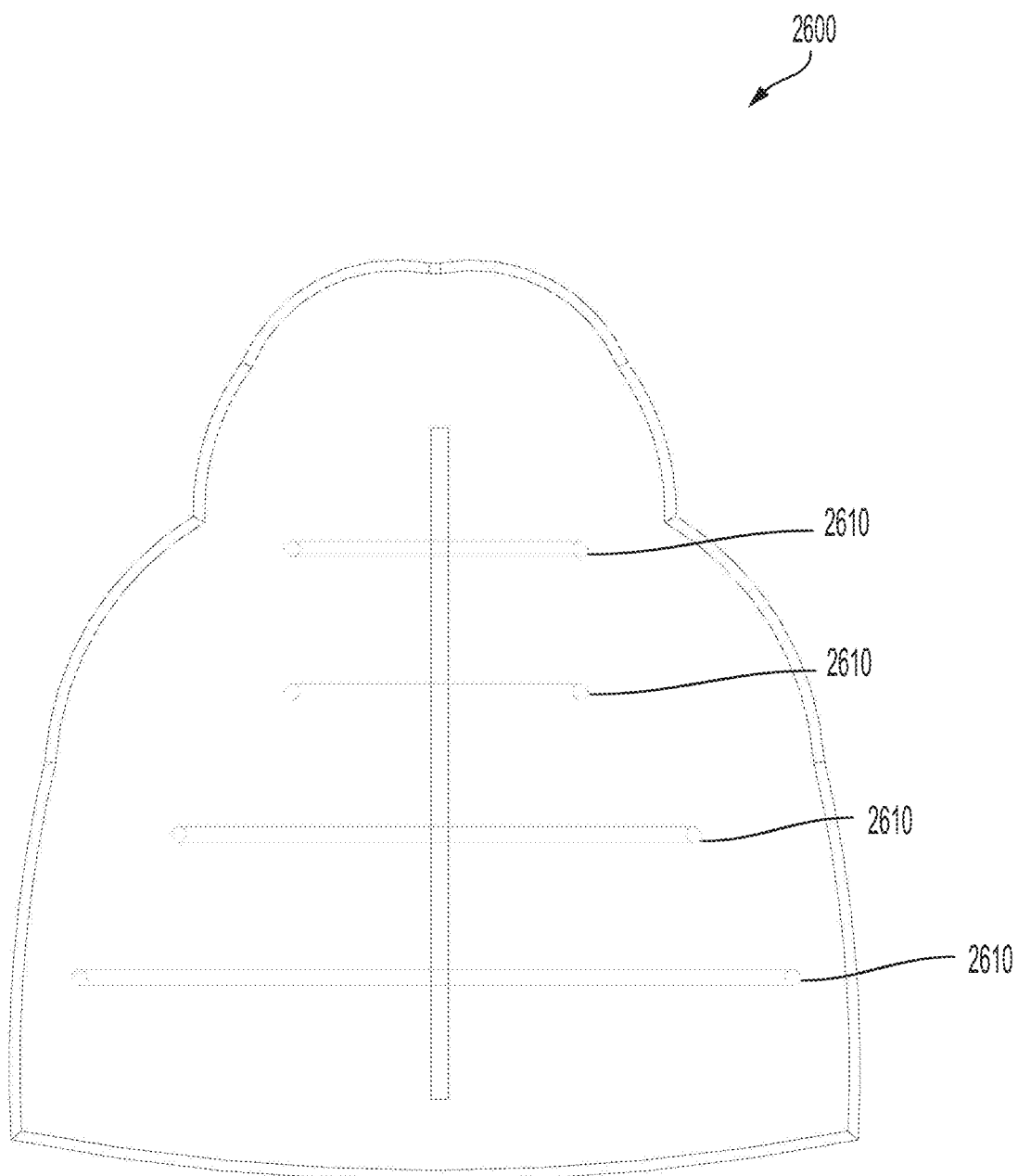
FIG. 26 illustrates a seat back with multibend sensors.
Figure 27:
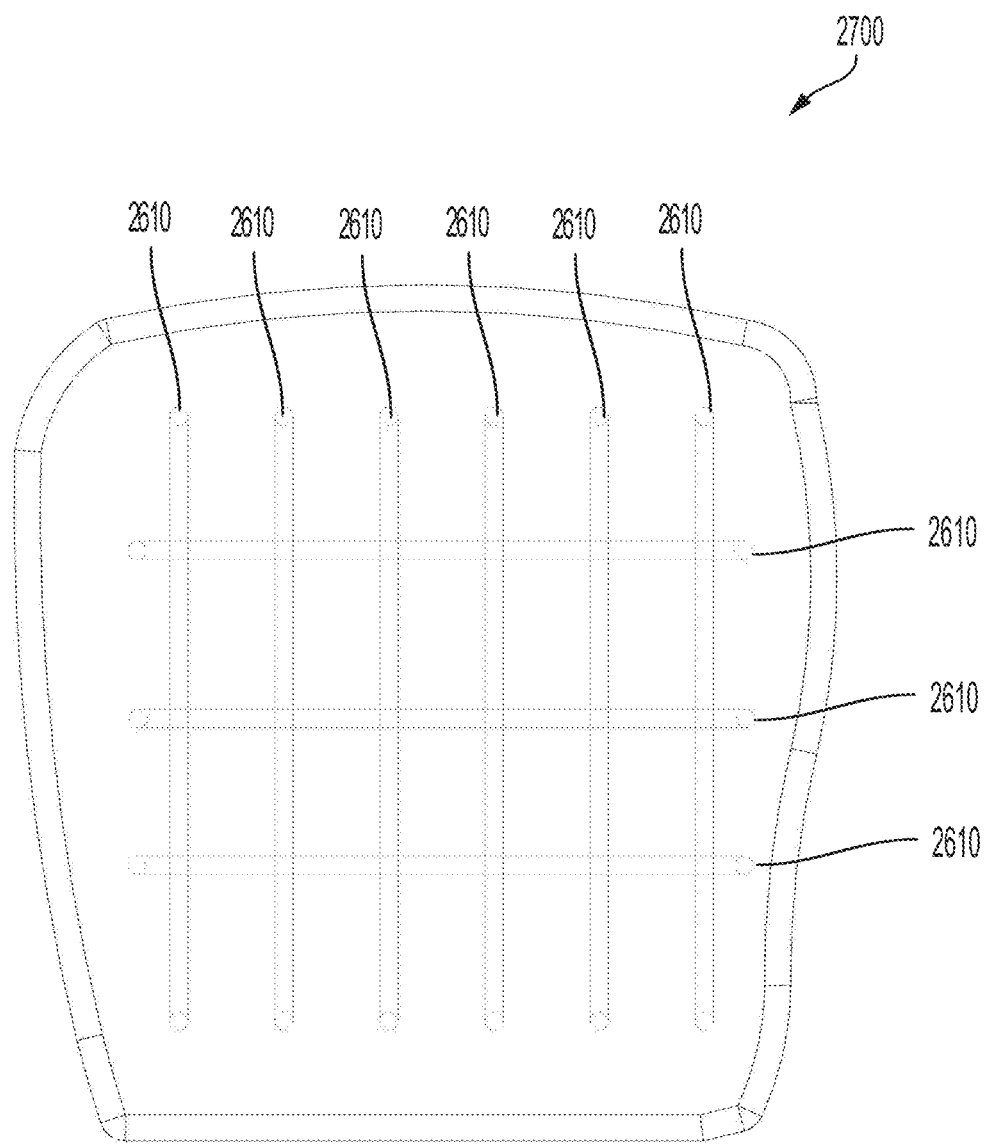
FIG. 27 illustrates a seat bottom with multibend sensors.

Turning to FIGS. 26 and 27, seat components including at least one multibend sensor 2610, as described elsewhere herein, are illustrated. In an embodiment a seat component is a seat back 2600. In an embodiment, a seat component is a seat bottom 2700. In an embodiment, a seat component comprises at least one of a seat back 2600, a seat bottom 2700, a headrest, an armrest, and a combination thereof. In an embodiment, the seat component is manufactured at least in part out of a deformable material. In an embodiment, the seat component is manufactured in part out of a polymer. In an embodiment, the seat component is manufactured in part out of foam. In an embodiment, the seat component is manufactured in part out of plastic. In an embodiment, the seat component is manufactured in part out of leather. In an embodiment, the seat component includes metal springs to provide support for the user and maintain the overall contour or shape of the seat.

In an embodiment, a seat component with at least one multibend sensor 2610 is able to detect a user interacting with the seat component (e.g., sitting, leaning, or grabbing on). In an embodiment, the at least one multibend sensor 2610 conforms to the deformations of the contours of the seat component caused by a user or object acting on the seat component. In an embodiment, a seat component with at least one multibend sensor 2610 is able to determine at least one characteristic or biometric of a user (e.g., height, weight, posture, weight distribution) by determining the deformation (i.e., bends, shapes, and contours) experienced by the seat component.

By combining the sensed deformation of the seat component and the physical properties found materials in the seat component, accurate measurements can be made about the forces acting on the seat. In an embodiment, each type of occupant has a unique deformation profile. That is, each type of occupant—pet, child, adult, object—deforms the seat components in a specific way. For instance, a dog standing on the seat bottom would create four distinct indentations, while an adult sitting on the same seat would create two large indentations. Similarly, the deformations created by a child and an adult would differ greatly in depth and footprint. In an embodiment, a seat component with at least one multibend sensor 2610 is able to distinguish between an object, a pet, a child, and an adult. Further, because each user is different, unique user profiles for each user can be created to identify when an specific user is in contact with the seat. In an embodiment, seat systems including multibend sensors can determine whether a user or an object is in contact with the seat.

Additionally, in an embodiment, seat systems including multibend sensors can determine a change in position or pose of the user. In an embodiment, seats including multibend sensors can be used as part of a vehicle safety system. The system can determine if the user is incapacitated or in a precarious position by looking at the user's posture. Further, in the event of an accident the system can use the information provided by the seat components to modify the vehicles active safety systems to protect the user. For instance, in a front end collision, the vehicle safety system may detect that the user is out of the desired range of the airbags (e.g., leaning forward or to one side) and selectively activate different airbags to better mitigate the user's injuries.

Returning now to FIGS. 26 and 27, in an embodiment, the at least one multibend sensor 2610 may be arranged in at least one of horizontally, vertically, diagonally, or any combination thereof. In an embodiment, the seat component comprises a plurality of multibend sensors 2610. In an embodiment, the multibend sensors 2610 are positioned on different sections of the seat component. In an embodiment, the multibend sensors 2610 are symmetrically positioned on the seat component. In an embodiment, a plurality of multibend sensors 2610 are located with respect to the upper back of the seat back 2600. In an embodiment, at least one multibend sensor 2610 is located with respect to the lumbar area of the seat back 2600. In an embodiment, at least one multibend sensor 2610 is located with respect to a headrest portion of the seat back 2600. In an embodiment, at least one multibend sensor 2610 is located with respect to the side bolsters of the seat back 2600 and/or the seat bottom 2700. In an embodiment, the multibend sensors 2610 are located on the areas of the seat component most likely to receive a portion of the user.

Vehicle Seat with Integrated Sensing and Environment Control

Figure 28:
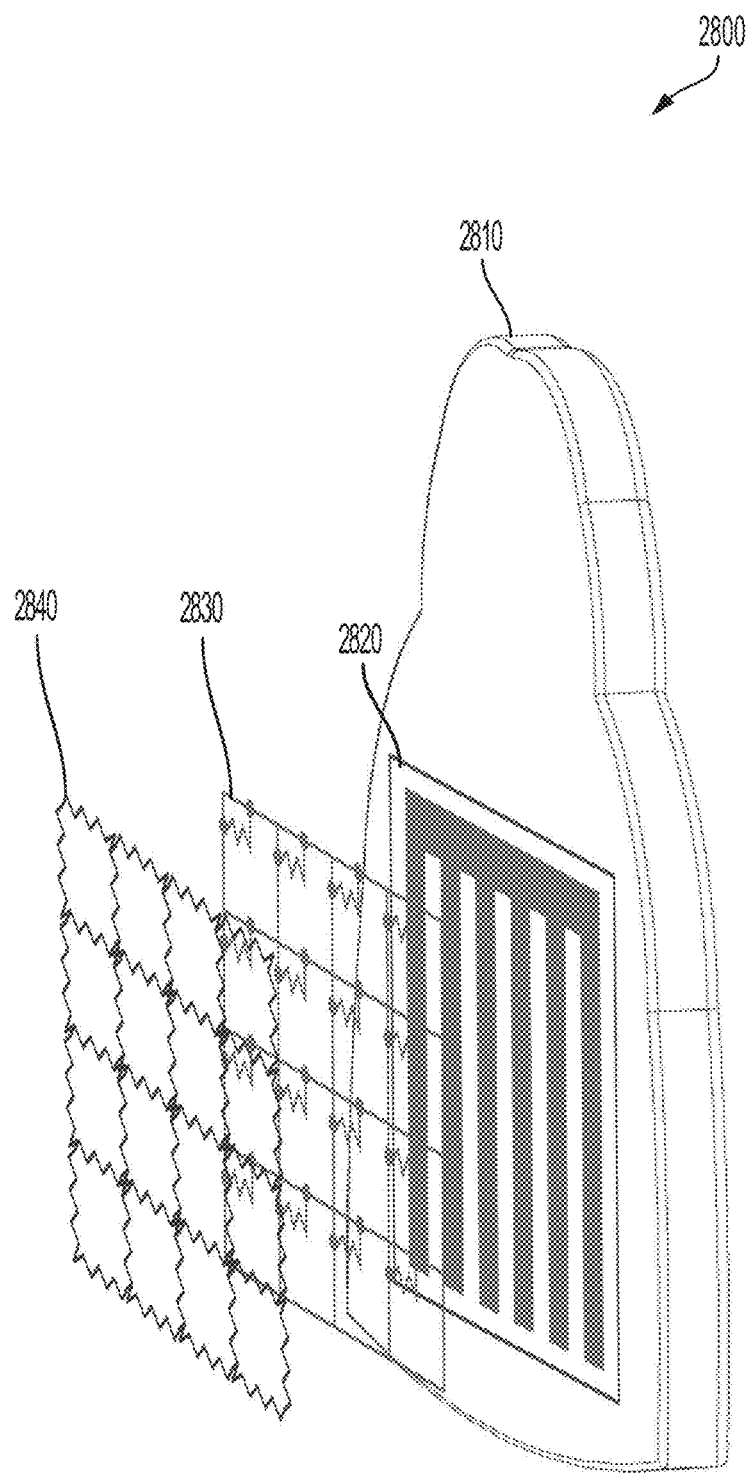
FIG. 28 is an exploded view of a seat component.

Referring now to FIG. 28, an exploded view of seat component 2800 is shown. In an embodiment, the seat component 2800 may include at least one of a mechanical layer 2810, a sensor layer 2820, a heating/cooling layer 2830, and a capacitive sensing layer 2840. In an embodiment, the sensor layer 2820 includes at least one multibend sensor as described herein. In an embodiment, the multibend sensors may provide information about the shape of at least one of the mechanical layer 2810, the sensor layer 2820, the heating/cooling layer 2830, the capacitive sensing layer 2840, and the user.

In an embodiment, the sensor layer 2820 is disposed between the mechanical layer 2810 and a user. In an embodiment, the mechanical layer 2810 is disposed between the sensor layer 2820 and the user. As may be appreciated by those skilled in the art, the arrangement of the mechanical layer 2810, the sensor layer 2820, the heating/cooling layer 2830, and the capacitive sensing layer 2840 with respect to each other is non-limiting and may be achieved in a multitude of arrangements. In an embodiment, the arrangement of the layers varies depending on the location of the layers with respect to the user. In other words, in an embodiment, the layer arrangement may vary between seat components of the same seat.

In an embodiment, the mechanical layer 2810 may include at least one of a foam layer, a spring layer, a deformable material, and a combination thereof. As may be appreciated by those skilled in the art the mechanical layer 2810 may include any material used in the manufacture of seating, furniture, and/or upholstery and, therefore, is not limiting. In an embodiment, the mechanical layer 2810 may include an actuator capable of changing its overall shape. In an embodiment, the mechanical layer 2810 may include a pneumatic and/or hydraulic bladder. In an embodiment, the mechanical layer 2810 may include electromechanical actuators.

In an embodiment, the seat comprises a dynamic heating system. In an embodiment, the heating/cooling layer 2830 is part of the dynamic heating system. In an embodiment, the heating/cooling layer 2830 comprises a heating array. In an embodiment, the heating array includes a plurality of heating elements (i.e., resistors). In an embodiment, the heating elements of the dynamic heating system can be used to generate heat.

In an embodiment, the heating elements of the dynamic heating system can be used to measure temperature. As will be understood by those skilled in the art, a voltage drop across a resistor occurs as a resistor heats up or is in the presence of a heat source. As a result a resistor may be used to measure temperature as well as radiate heat. In an embodiment, the resistor is a negative temperature coefficient (NTC) resistor. In an embodiment, the resistor is a negative temperature coefficient (NTC) resistor. In an embodiment, the resistor is a positive temperature coefficient (PTC) resistor.

In an embodiment, the dynamic heating system comprises multiple heating/temperature measuring elements. In an embodiment, the resistors are arranged in a row/column pattern. A row/column intersection is known as a "cell." In an embodiment, each resistor in this arrangement can be selectively activated to provide heat or to measure temperature by selecting the corresponding row/column combination. In an embodiment, each resistor provides an independent measure of temperature. In an embodiment, the amount of insulation between the heating/cooling layer 2830 and the user at each row/column intersection can be determined by looking at the thermal resistance. In an embodiment, the thermal resistance is determined by measuring temperature change with a known amount of power input. In an embodiment, the dynamic heating system can discriminate between seat areas in contact with different pieces of clothing; for instance, a heavy coat versus a thin t-shirt. In an embodiment, the dynamic heating system can dynamically adjust heat cells or regions to optimize heating performance. In an embodiment, the information gathered by the dynamic heating system is combined with the information provided by the sensor layer 2820 and the capacitive sensing layer 2840 to determine information about the user. In In an embodiment, a heater array is provided by controlling the amount of power applied and sensing with the same heater array elements at least one of a power input and a temperature. In an embodiment, heating and/or cooling is applied where a person is sitting within a seat or a seat component. In an embodiment, heating and/or cooling is applied evenly to a person by taking into account the amount of material (including clothing) between the heating/cooling element and the person.

Figure 29:
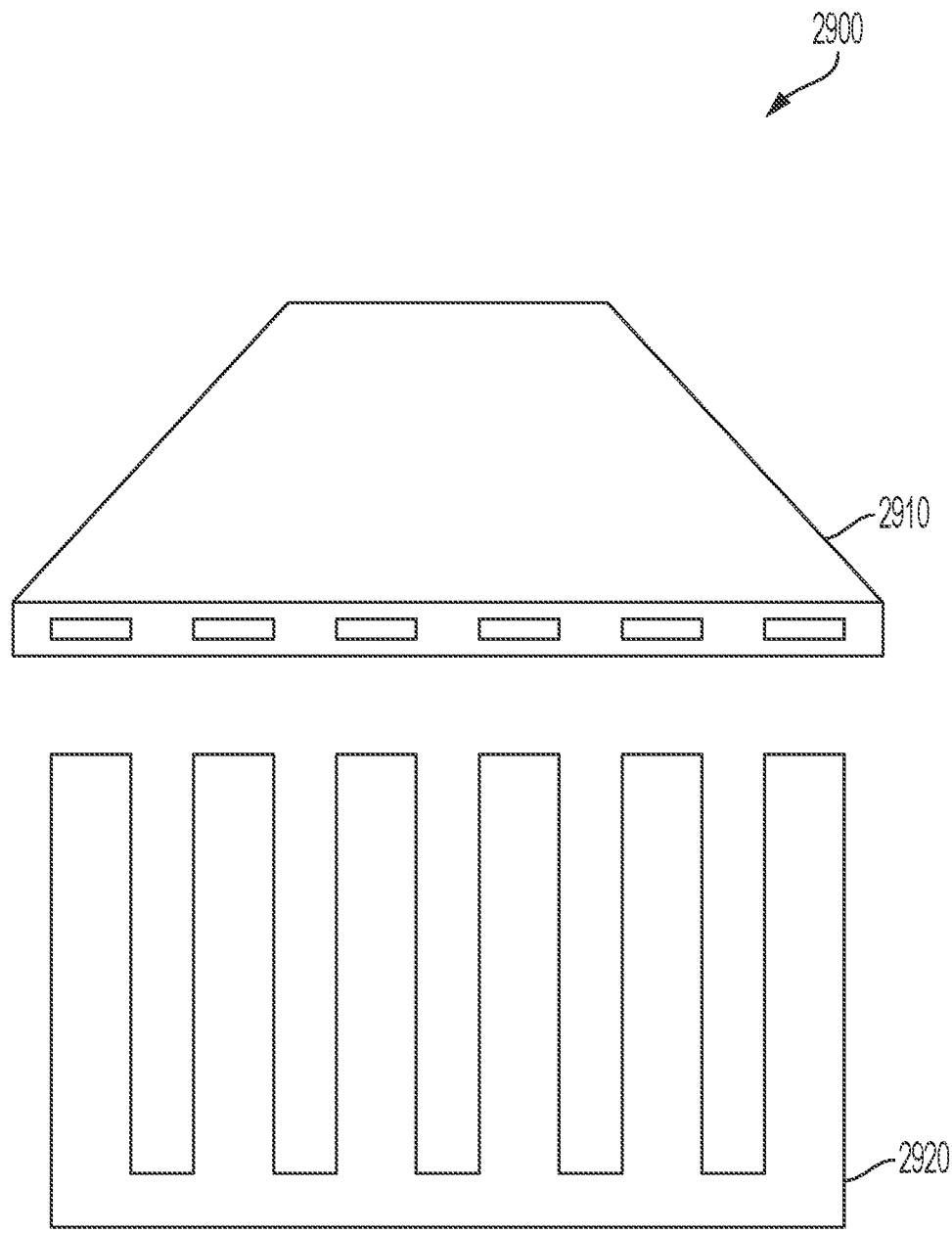
FIG. 29 is an exploded view of a sensor layer.

Turning to FIG. 29, a sensor layer 2900 is illustrated. In an embodiment, the sensor layer 2900 may include a housing 2910 and at least one multibend sensor 2920 as described herein. In an embodiment, the housing 2910 may be a flexible mat that maintains the relative geometry of the at least one multibend sensor 2920. In an embodiment, the housing 2910 comprises a thermoplastic polyurethane (TPU) component. In an embodiment, the housing 2910 comprises a thermoplastic polyurethane (TPU) component.

As may be appreciated by those skilled in the art, in an embodiment, the multibend sensor 2920 may be several interconnected or standalone multibend sensors. In an embodiment, the housing 2910 provides crush protection for the multibend sensor 2920. In an embodiment, the housing 2910 allows the multibend sensor 2920 to deform while protecting it from breaking.

An aspect of the present invention is a vehicle seat comprising a seat component having a contour; wherein the contour changes when at least a portion of a user's body is in contact with the seat component. In an embodiment, the vehicle seat further comprises at least one multibend sensor operatively connected to the seat component and adapted to at least partially conform to the contour of the seat component. The at least one multibend sensor comprises a signal generation source adapted to transmit signals and a signal receiver adapted to receive at least some of the transmitted signals. In an embodiment, a signal processor is operatively connected to the signal receiver, the signal processor is adapted to make at least one measurement associated with the received signals. In an embodiment, a sensing module is operatively connected to the signal processor and configured to use the at least one measurement to determine information regarding the contour of the seat component.

Another aspect of the invention is a vehicle seat comprising a deformable seat component capable of assuming a shape of at least a portion of a user's body when the user is in contact with the vehicle seat. In an embodiment, a multibend sensor is operatively connected to the seat component and adapted to at least partially conform to the shape assumed by the seat component; the multibend sensor comprising a signal generation source adapted to transmit signals and a signal receiver adapted to receive at least some of the transmitted signals. In an embodiment, the vehicle seat further comprises a signal processor operatively connected to the signal receiver, the signal processor is adapted to make at least one measurement associated with the received signals; and further adapted to use the at least one measurement to determine a use of the vehicle seat.

Another aspect of the invention is a vehicle seat comprising a seat component having a contour; wherein the contour changes when at least a portion of a user's body is in contact with the seat component. In an embodiment, the vehicle seat further comprises a plurality of multibend sensors operatively connected to the seat component and adapted to at least partially conform to the contour of the seat component; each multibend sensor comprising a sliding strip having a first plurality of electrodes, wherein each of the first plurality of electrodes is adapted to transmit at least one signal, and a reference strip having a second plurality of electrodes, wherein each of the second plurality of electrodes is adapted to receive a signal; wherein each sliding strip and each reference strip of each of the plurality of multibend sensors is adapted to flexibly move in at least one dimension with respect to a corresponding sliding strip or reference strip and to freely move with respect to at least one other sliding strip or reference strip. In an embodiment, the signal processor is operatively connected to the second plurality of electrodes of at least one of the plurality of multibend sensors. The signal processor adapted to process the signals received by the second plurality of electrodes of the at least one of the plurality of multibend sensors to determine information regarding the contour of the seat component.

As used herein, and especially within the claims, ordinal terms such as first and second are not intended, in and of themselves, to imply sequence, time or uniqueness, but rather, are used to distinguish one claimed construct from another. In some uses where the context dictates, these terms may imply that the first and second are unique. For example, where an event occurs at a first time, and another event occurs at a second time, there is no intended implication that the first time occurs before the second time, after the second time or simultaneously with the second time. However, where the further limitation that the second time is after the first time is presented in the claim, the context would require reading the first time and the second time to be unique times. Similarly, where the context so dictates or permits, ordinal terms are intended to be broadly construed so that the two identified claim constructs can be of the same characteristic or of different characteristic. Thus, for example, a first and a second frequency, absent further limitation, could be the same frequency, e.g., the first frequency being 10 Mhz and the second frequency being 10 Mhz; or could be different frequencies, e.g., the first frequency being 10 Mhz and the second frequency being 11 Mhz. Context may dictate otherwise, for example, where a first and a second frequency are further limited to being frequency-orthogonal to each other, in which case, they could not be the same frequency.

While the invention has been particularly shown and described with reference to a preferred embodiment thereof, it will be understood by those skilled in the art that various changes in form and details may be made therein without departing from the spirit and scope of the invention.

The invention claimed is:

1. A vehicle seat comprising:
a seat component having a contour; wherein the contour changes when at least a portion of a user's body is in contact with the seat component;
at least one multibend sensor, wherein the at least multibend sensor is adapted to determine multiple bends along a length of the at least multibend sensor, the at least one multibend sensor operatively connected to the seat component and adapted to at least partially conform to the contour of the seat component; the at least one multibend sensor comprising a signal generation source adapted to transmit signals and a signal receiver adapted to receive at least some of the transmitted signals, wherein the at least one multibend sensor comprises a sliding strip and a reference strip, wherein the reference strip is adapted to flexibly move in at least one dimension with respect to the sliding strip; and,
a signal processor operatively connected to the signal receiver, the signal processor adapted to make at least one measurement associated with the received signals, wherein the at least one measurement is used to determine information regarding the contour of the seat component.

2. The vehicle seat of claim 1, wherein the information is the presence or absence of the user.

3. The vehicle seat of claim 1, wherein the information is a biometric of the user.

4. The vehicle seat of claim 1, wherein the information is a position of the user.

5. The vehicle seat of claim 1, wherein the information is at least one of a weight and a height of the user.

6. The vehicle seat of claim 1, wherein the information is the presence or absence of an object.

7. The vehicle seat of claim 1, wherein the sensing module is part of the signal processor.

8. A vehicle seat comprising:
a deformable seat component capable of assuming a shape of at least a portion of a user's body when the user is in contact with the vehicle seat;
a multibend sensor, wherein the multibend sensor is adapted to determine multiple bends along a length of the multibend sensor, the multibend sensor operatively connected to the seat component and adapted to at least partially conform to the shape assumed by the seat component; the multibend sensor comprising a signal generation source adapted to transmit signals and a signal receiver adapted to receive at least some of the transmitted signals, wherein the multibend sensor comprises a sliding strip and a reference strip, wherein the reference strip is adapted to flexibly move in at least one dimension with respect to the sliding strip; and,
a signal processor operatively connected to the signal receiver, the signal processor adapted to make at least one measurement associated with the received signals; and further adapted to use the at least one measurement to determine a use of the vehicle seat.

9. The vehicle seat of claim 8, wherein the signal processor detects a presence or absence of the user.

10. The vehicle seat of claim 8, wherein the signal processor is further adapted to distinguish between an infant, a child, and an adult.

11. The vehicle seat of claim 8, wherein the signal processor is further adapted to distinguish between a pet and a human.

12. The vehicle seat of claim 8, wherein the signal processor detects a biometric of the user.

13. The vehicle seat of claim 8, wherein the signal processor detects at least one of a position, a pose, and a movement of the user.

14. The vehicle seat of claim 8, wherein the signal processor detects at least one of a weight and a height of the user.

15. The vehicle seat of claim 8, wherein the signal processor detects the presence or absence of an object.

16. A vehicle seat comprising:
a seat component having a contour; wherein the contour changes when at least a portion of a user's body is in contact with the seat component;
a plurality of multibend sensors, the wherein the plurality of multibend sensors adapted to determine multiple bends along a length of each of the plurality of multibend sensors, the plurality of multibend sensors operatively connected to the seat component and adapted to at least partially conform to the contour of the seat component; each multibend sensor comprising a sliding strip having a first plurality of electrodes, wherein each of the first plurality of electrodes is adapted to transmit at least one signal, and a reference strip having a second plurality of electrodes, wherein each of the second plurality of electrodes is adapted to receive a signal; wherein each sliding strip and each reference strip of each of the plurality of multibend sensors is adapted to flexibly move in at least one dimension with respect to a corresponding sliding strip or reference strip and to freely move with respect to at least one other sliding strip or reference strip; and,
a signal processor operatively connected to the second plurality of electrodes of at least one of the plurality of multibend sensors; the signal processor adapted to process the signals received by the second plurality of electrodes of the at least one of the plurality of multibend sensors to determine information regarding the contour of the seat component.

17. The vehicle seat of claim 16, wherein the signal processor uses the information to determine the presence or absence of the user.

18. The vehicle seat of claim 16, wherein the signal processor uses the information to distinguish between a pet, an infant, a child, and an adult.

19. The vehicle seat of claim 16, wherein the signal processor uses the information to detect at least one of a position, a pose, and a movement of the user.

20. The vehicle seat of claim 16, wherein the signal processor uses the information to detect the presence or absence of an object.

* * * * *